US012255034B2

(12) United States Patent
Cawood

(10) Patent No.: US 12,255,034 B2
(45) Date of Patent: Mar. 18, 2025

(54) FUSE END CAP HAVING DISPLACEABLE ALIGNMENT PIN

(71) Applicant: ABB SCHWEIZ AG, Baden (CH)

(72) Inventor: Matthew D. Cawood, De Leon Springs, FL (US)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 18/602,849

(22) Filed: Mar. 12, 2024

(65) Prior Publication Data

US 2024/0222060 A1 Jul. 4, 2024

Related U.S. Application Data

(62) Division of application No. 17/662,385, filed on May 6, 2022, now Pat. No. 11,961,691.

(60) Provisional application No. 63/186,602, filed on May 10, 2021.

(51) Int. Cl.

| | |
|---|---|
| ***H01H 31/12*** | (2006.01) |
| ***H01H 85/055*** | (2006.01) |
| ***H01H 85/165*** | (2006.01) |

(52) U.S. Cl.

CPC ........ *H01H 85/165* (2013.01); *H01H 31/127* (2013.01); *H01H 85/055* (2013.01)

(58) Field of Classification Search

CPC .. H01H 31/127; H01H 85/055; H01H 85/157; H01H 85/165; H01H 85/30; H01H 85/303

See application file for complete search history.

(56) References Cited

U.S. PATENT DOCUMENTS

| | | | | |
|---|---|---|---|---|
| 3,601,739 A * | 8/1971 | Blewitt | H01H 85/303 337/244 |
| 4,159,185 A * | 6/1979 | Scherer | H01H 69/02 403/375 |
| 4,204,182 A * | 5/1980 | Knapp, Jr. | H01H 85/303 337/267 |
| 5,566,423 A * | 10/1996 | Hassler | H01H 9/32 16/319 |

* cited by examiner

*Primary Examiner* — Jacob R Crum

(74) *Attorney, Agent, or Firm* — Greenberg Traurig, LLP

(57) ABSTRACT

A fuse assembly having a displaceable pin assembly secured within a cap bore of an end cap of the fuse assembly. The displaceable pin assembly can include a plunger that is selectively displaceable along an axis that is non-parallel to a central longitudinal axis of the first end cap. The plunger can be selectively displaceable between an extended position at which at least a first end of the plunger is outwardly positioned away from an outer surface of the first end cap, and a recessed position at which the first end of the plunger is recessed within, or generally aligned with the outer surface of, the first end cap. The displaceable pin assembly can also include a biasing element that can bias the plunger to the extended position, and a support body that can house at least a portion of the plunger and be securely coupled to the cap bore.

4 Claims, 16 Drawing Sheets

FUSE END CAP HAVING DISPLACEABLE ALIGNMENT PIN

CROSS-REFERENCE TO RELATED APPLICATIONS

The present application is a divisional of U.S. patent application Ser. No. 17/662,385, filed on May 6, 2022, which claims priority to and benefit of U.S. Provisional Patent Application No. 63/186,602, filed May 10, 2021, and entitled "FUSE END CAP HAVING DISPLACEABLE ALIGNMENT PIN," the entirety of which is herein incorporated by reference.

FIELD

The present disclosure relates to the field of electrical fuses, and more particularly, to end caps for electrical fuses.

BACKGROUND

At least certain types of electrical fuses can be utilized with assemblies, including, for example, cutout assemblies, in which, in response to an overcurrent situation, an end of the fuse can be released from engagement with an electrical contact of the assembly. According to certain assemblies, adapters are secured to opposing ends of the fuse, and are used to secure the fuse to the assembly at a position that electrically couples the fuse to electrical contacts of the assembly. Often such adapters include an upper adapter that can, in response to an overcurrent condition, be releasable from the assembly, and a lower adapter that can, upon release of the upper adapter from the assembly, accommodate pivotal displacement of the fuse relative to the assembly. Typically, securing the fuse to the assembly involves the adapters being at a particular alignment relative to each other such that features of the adapters can be received, or operably engaged, by corresponding mating features in the assembly.

SUMMARY

Whereas some manners of coupling adapters to corresponding ends of a fuse can result in inadvertent rotational and/or angular displacement of the fuse and another adapter that may already be coupled to the fuse. Such displacement can result in angular misalignment of the adapters, which can increase the difficultly, if not prevent, the fuse from being properly secured to the assembly. For example, such misalignment may result in one of the adapters not being able to be positioned and/or oriented to engage mating features of the assembly while the other adapter is secured to, or engaged with, corresponding mating features of the assembly. These and other disadvantages can be overcome by the various embodiments disclosed below.

According to some embodiments, a fuse assembly comprises a casing positioned between a first end cap and a second end cap of the fuse assembly, the first end cap and the second end cap each being an electrical contact that is electrically coupled to a fuse element, the fuse element being housed at least within an interior region of the casing. The fuse assembly can also include a displaceable pin assembly, a least a portion of the displaceable pin assembly being secured within a cap bore of the first end cap. Further, the displaceable pin assembly can comprise a plunger that is selectively displaceable along an axis that is non-parallel to a central longitudinal axis of the first end cap. Moreover, the plunger can be selectively displaceable between an extended position at which at least a first end of the plunger is outwardly positioned away from an outer surface of the first end cap, and a recessed position at which the first end of the plunger is recessed within the first end cap or is generally aligned with the outer surface of the first end cap.

According to some embodiments, a fuse cutout assembly comprises a cutout body having a first contact, a second contact, and an insulator, an upper adapter configured for releasable coupling to the cutout body, and a lower adapter configured to be pivotally coupled to the cutout body, the lower adapter having a notch in a wall of the lower adapter. Further, the fuse assembly can comprise a first end cap configured to be securely positioned within an interior area of the lower adapter, a second end cap configured to be securely attached to the upper adapter, and a casing positioned between a first end cap and a second end cap. The first end cap and the second end cap can each be an electrical contact that is electrically coupled to a fuse element, the fuse element being housed at least within an interior region of the casing. The fuse assembly can further include a displaceable pin assembly, at least a portion of the displaceable pin assembly being secured within the first end cap. The displaceable pin assembly can include a plunger that is selectively displaceable along an axis that is non-parallel to a central longitudinal axis of the fuse assembly. The plunger can be selectively displaceable between an extended position at which at least a first end of the plunger is outwardly positioned away from an outer surface of the first end cap, and a recessed position at which the first end of the plunger is recessed within the first end cap or is generally aligned with the outer surface of the first end cap. Additionally, the plunger can be configured to be received in the notch of the lower adapter when the first end cap is positioned in the interior area of the lower adapter and the plunger is aligned with the notch and at the extended position. Further, the notch and the plunger can be positioned to, when the plunger is received in the notch, orient the fuse assembly at a predetermined rotational and linear alignment relative to at least the lower adapter.

According to some embodiments, there are various methods of installing an adapter about first end cap of a fuse assembly, the first end cap, and a second end cap of the fuse assembly, wherein each being an electrical contact that is electrically coupled to a fuse element that is housed within the fuse assembly. The methods can include inwardly displacing a first end of a plunger from an extended position at which the first end is positioned outside an outer surface of the first end cap to a recessed position at which the first end is in, or aligned with the outer surface of, the first end cap. The methods can also include sliding, while the plunger is at the recessed position, the adapter around at least a portion of the outer surface, and aligning, with the adapter positioned around at least a portion of the outer surface, a notch in the adapter with the plunger.

These and other aspects of the present invention will be better understood in view of the drawings and following detailed description.

DRAWINGS

Some embodiments of the disclosure are herein described, by way of example only, with reference to the accompanying drawings. With specific reference now to the drawings in detail, it is stressed that the embodiments shown are by way of example and for purposes of illustrative discussion of embodiments of the disclosure. In this regard, the description taken with the drawings makes apparent to those skilled in the art how embodiments of the disclosure may be practiced.

DETAILED DESCRIPTION

Figure 1:
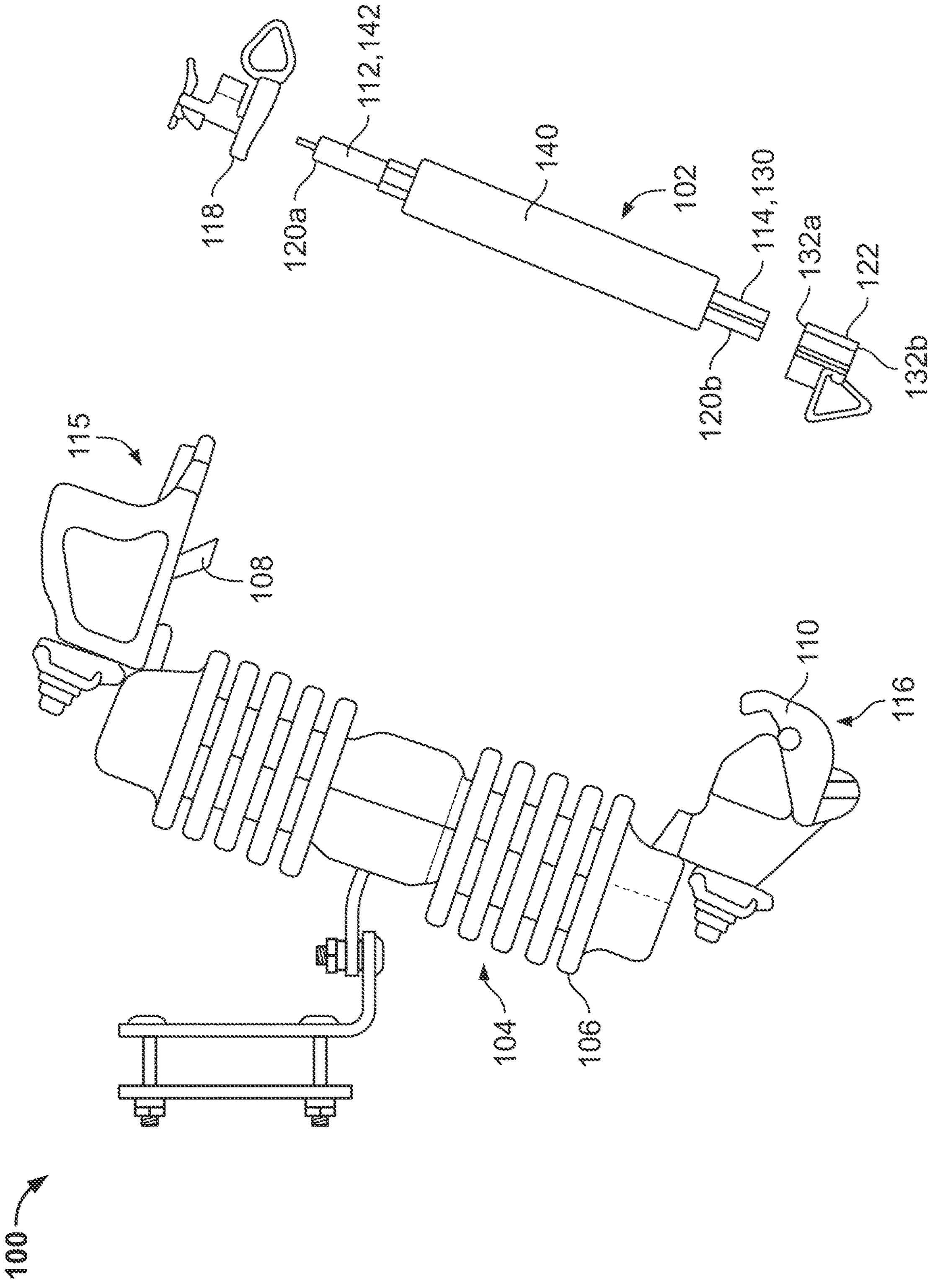
FIG. 1 illustrates a partially exploded side view of an exemplary fuse cutout assembly utilizing an exemplary fuse assembly according to an embodiment.

Among those benefits and improvements that have been disclosed, other objects and advantages of this disclosure will become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given regarding the various embodiments of the disclosure which are intended to be illustrative, and not restrictive.

Throughout the specification and claims, the following terms take the meanings explicitly associated herein, unless the context clearly dictates otherwise. All embodiments of the disclosure are intended to be combinable without departing from the scope or spirit of the disclosure.

Certain terminology is used in the foregoing description for convenience and is not intended to be limiting. Words such as “upper,” “lower,” “top,” “bottom,” “first,” and “second” designate directions in the drawings to which reference is made. This terminology includes the words specifically noted above, derivatives thereof, and words of similar import. Additionally, the words “a” and “one” are defined as including one or more of the referenced item unless specifically noted. The phrase “at least one of” followed by a list of two or more items, such as “A, B or C,” means any individual one of A, B or C, as well as any combination thereof.

FIG. 1 illustrates a side view of an exemplary fuse cutout assembly 100 utilizing a fuse assembly 102 according to an illustrated embodiment of the present application. The fuse cutout assembly 100 can be utilized, for example, in connection with providing protection from at least current surges and overloads in high and medium voltage electric utility services, including, but not limited to, in electrical transmission systems and distribution systems operating at nominal voltages of about 3 kilovolts (kV) to about 38 kV, among other voltages and voltage ranges. In addition to the fuse assembly 102, the fuse cutout assembly 100 can include a cutout body 104 that supports the fuse assembly 102, and to which an insulator 106 is attached. The cutout body 104 can include an upper contact 108 and a lower contact 110 at opposing ends of the cutout body 104 that are positioned to be electrically coupled to first and second contacts 112, 114, respectively, of the fuse assembly 102. The upper contact 108 can be biased by a biasing element so as to provide a biasing force that at least attempts to maintain an engagement between the upper contact 108 of the cutout body 104 and the first contact 112 of the fuse assembly 102.

As seen in FIG. 1, when the fuse assembly 102 is supported by the cutout body 104, and the first contact 112 of the fuse assembly 102 is electrically coupled to the upper contact 108 of the cutout body 104, the cutout body 104 supports the fuse assembly 102 at an angle. With respect to at least some of the different types of fuses that can be utilized with embodiments of the subject application, in response to an overcurrent condition, the fuse assembly 102 can be activated in a manner that can release a strike pin that is housed within the fuse assembly 102. The released strike pin can exert a force against, or in the general area, of the upper contact 108 in manner that can depress a portion of the cutout body 104 away from the fuse assembly 102, thereby facilitating physical and/or electrical disengagement between the first contact 112 of the fuse assembly 102 and the upper contact 108. In the event the fuse assembly 102 is to be disengaged from direct contact with the first contact 112 of the cutout body 104, the angle at which the fuse assembly 102 is supported by the cutout body 104 can allow gravitational forces to at least assist in the fuse assembly 102 being pivotally displaced about a lower coupling 116 of the cutout body 104 such that the first contact 112 of the fuse assembly 102 is rotated away from the upper contact 108 of the cutout body 104.

The cutout body 104 can include an upper adapter 118 that can be secured to, or about, an upper end 120*a* of the fuse assembly 102. The upper adapter 118 can be configured, including be sized and/or include features, that can engage mating features of the cutout body 104, such as, for example, an upper coupling 117 of the cutout body 104, in a manner that can secure the upper end 120*a* of the fuse assembly 102 to the cutout body 104, as well as accommodate the upper end 120*a* being released with the upper adapter 118 from the cutout body 104 in connection with the fuse assembly 102 responding to an overcurrent condition.

For example, according to at least some embodiments, the cutout body 104 can include an attachment hook that can, when the upper adapter 118 is in proper alignment relative to at least the cutout body 104 and/or attachment hook, receive, and relatively securely engage, the upper adapter 118, and thus the upper end 120*a* of the fuse assembly 102, to the cutout body 104. Additionally, or alternatively, according to certain embodiments, the cutout body 104 can include one or more openings or slots (collectively referred to as openings) that can, when the upper adapter 118 is in proper alignment relative to at least the cutout body 104, receive one or more mating pins, which may or may not be coupled to the upper adapter 118. According to certain embodiments, such openings can be configured and positioned so as to, in the absence of an overcurrent condition, securely retain engagement of the pins, and/or other features of the upper adapter 118 with the cutout body 104.

In the event of an overcurrent condition, the attachment hook and/or openings of the cutout body 104 can be displaced, such as, for example, in connection with a strike pin assembly of the fuse assembly 102 exerting a force against the cutout body 104 in a manner that lifts or otherwise displaces the hook and/or openings, among other portions of the cutout body 104, in a direction that can facilitate disengagement or release of the upper adapter 118, and/or associated features of the upper adapter 118, from the hook and/or the associated openings of the cutout body 104.

As seen in FIG. 1, the lower coupling 116 can also be pivotally coupled to a lower casting or adapter 122 that is secured to a lower end 120*b* of the fuse assembly 102. As seen in at least FIG. 3, the lower adapter 122 can include a wall 124 having an inner surface 126 that generally defines an interior region 128 of the lower adapter 122. The interior region 128 is configured to receive insertion of at least a portion of the lower end 120*b* of the fuse assembly 102, such as, for example, at least a portion of a lower end cap 130 of the fuse assembly 102. According to certain embodiments, the inner surface 126 can have a generally circular cross-sectional shape. Further, as seen in at least FIG. 4, the wall 124 can include opposing first and second ends 132*a*, 132*b*.

The lower coupling 116 of the cutout body 104 and the lower adapter 122 that is secured to the fuse assembly 102 can be configured to secure the lower end 120*b* of the fuse assembly 102 to the cutout body 104. In the event the fuse assembly 102 responds to an overcurrent condition, such as, for example, releasing a strike pin assembly of the fuse assembly 102 that facilitates the release of the upper adapter 118 from the cutout body 104, as discussed above, the lower coupling 116 is further configured to accommodate rotational displacement of the fuse assembly 102 while the lower adapter 122 remains attached to the cutout body 104. For example, as seen in at least FIGS. 3 and 4, the lower adapter 122 can include a pair of pins 134 that are positioned on opposing sides of the lower adapter 122. The pins 134 of the lower adapter 122 can each, when properly aligned with the lower coupling 116 of the cutout body 104, be received in a mating opening or slot in the lower adapter 122 of the cutout body 104. Additionally, the pins 134 of the lower adapter 122 and mating openings in the lower coupling 116 of the cutout body 104 can be sized such that, when the pins 134 are positioned in the openings, the lower adapter 122 can be pivotally displaceable about the lower coupling 116 and relative to at least the cutout body 104.

Often, both the upper adapter 118 and a lower adapter 122 are secured to, or about, the corresponding upper or lower end 120*a*, 120*b*, respectively, of the fuse assembly 102 prior to either of the upper adapter 118 or lower adapter 122 being coupled to the cutout body 104. Further, when secured to the fuse assembly 102, misalignment between the upper and lower adapters 118, 122 can result in one, but not both, of the upper and lower adapters 118, 122 being able to securely engage the mating features in the cutout body 104. For example, in such a situation, when the pins 134 of the lower adapter 122 are positioned to be, or have been, received in the mating openings in the lower coupling 116 of the cutout body 104, the upper adapter 118 can be attached to the upper end 120*a* of the fuse assembly 102 at an angular orientation that prevents the upper adapter 118, and/or associated features of the upper adapter 118, from being matingly received by the hook and/or mating openings, among other features, of the cutout body 104.

Such misalignment between at least the upper and lower adapters 118, 122 can occur in a variety of manners. For example, in at least some instances when the upper adapter 118 is secured to the upper end 120*a* of the fuse assembly 102, such misalignment may result from the rotation of the fuse assembly 102 that can occur when the lower adapter 122 is being mechanically coupled to the lower end 120*b* of the fuse assembly 102. For example, referencing FIGS. 3 and 9, according to certain embodiments, the lower adapter 122 can include a contact assembly 136 having a shoe 138 that provides at least a force against an end cap 130 of the fuse assembly 102 that securely clamps or couples the lower adapter 122 to the end cap 130 of the fuse assembly 102. In at least some instances, the location at which the contact assembly 136, such as the shoe 138, at least initially contacts the end cap 130, and/or the ensuing application of force against the end cap 130 by the contact assembly 136 can result in inadvertent rotational displacement of the fuse assembly 102 within the end cap 130, thereby rotating both the fuse assembly 102 and the upper adapter 118 in a manner that can result in misalignment between the upper and lower adapters 118, 122. As previously discussed, such misalignment can, in at least some instances, interfere and/or prevent the fuse assembly 102 from being secured at both ends of the fuse assembly 102 to the cutout body 104.

Figure 2:
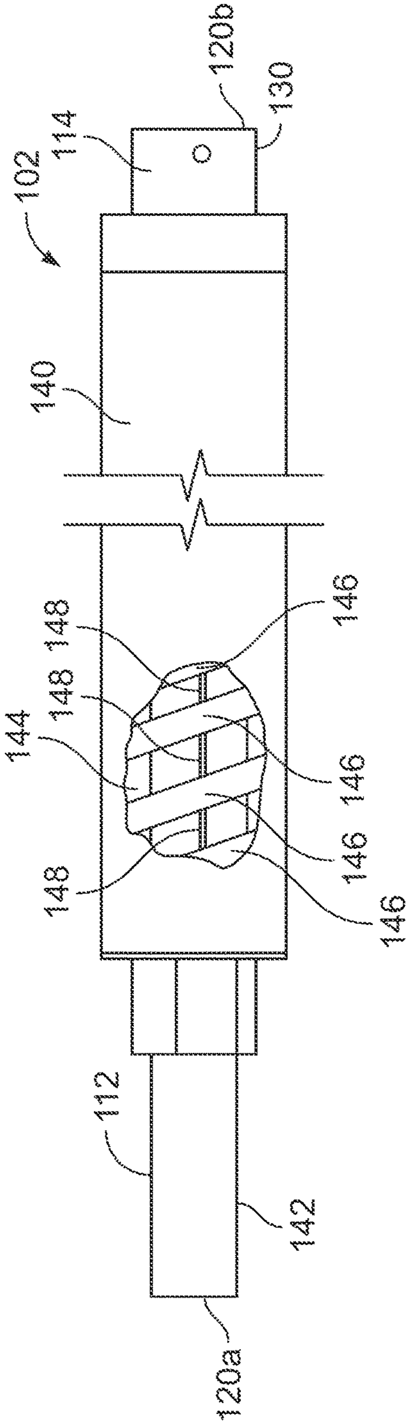
FIG. 2 illustrates a partial cutaway side view of an exemplary fuse assembly according to an embodiment.

FIG. 2 illustrates a partial cut away side view of an exemplary fuse assembly 102 according to an illustrated embodiment of the present application. As seen, the fuse assembly 102 includes a casing 140 that is positioned between a first end cap 130 and second end cap 130*a* that are located at opposing ends of the fuse assembly 102. According to the illustrated embodiment, an upper end cap 142 and the lower end cap 130 can provide the first and second contacts 112, 114, respectively, of the fuse assembly 102. Thus, the ends caps 130, 142 can be constructed from a metallically conductive material, such as, for example, but not limited to, brass, copper, silver, and/or tin, among other materials, as well as various combinations thereof. The casing 140 can be constructed from a variety of materials, and more specifically, electrically insulating materials. For example, according to certain embodiments, the casing 140 can be constructed from a ceramic material.

As seen by the cutaway portion of FIG. 2, the casing 140 can generally define an inner region 144 of the fuse assembly 102 that can extend along the casing 140 between the opposing end caps 130, 142, and which can house one or more components of the fuse assembly 102, as well as insulating and/or arc preventing material(s), such as, for example, sand. For example, as seen in FIG. 2, the inner region 144 can house one or more fuse elements 146. The fuse element 146 is electrically coupled to the first and second contacts 112, 114 of the fuse assembly 102, and can be constructed from a variety of materials, including, but not limited to, tin, lead, silver, copper, zinc or brass, among other materials or combinations of materials. As seen in FIG. 2, according to the exemplary embodiment, the fuse element 146 is generally wrapped about a support element or core that can be constructed from an electrically insulative material. However, the fuse element 146 can be arranged within the inner region 144 of the casing 140 in a variety of other manners, including having a generally linear orientation. Further, according to certain embodiments, at least a portion of the fuse element 146 can be encased or wrapped in an elastomeric material, such as, for example, silicon rubber.

According to an exemplary embodiment, the inner region 144 can also house a wire or filament 148 that is coupled to a strike pin assembly of the fuse assembly 102. At least prior to activation of a strike pin assembly of the fuse assembly 102, the filament 148 can be maintained in a relatively taut condition such that filament 148 can provide a holding force against at least a portion of the strike pin assembly that can at least assist in preventing activation of the strike pin assembly. In the event of a current surge or other overload condition, the degree of current flowing through the fuse element 146 can result in the fuse element 146 generating heat, and/or cause gases within the inner region 144 to be heated, to levels that can heat the filament 148 to a degree that can cause a break(s) or separation(s) in the filament 148. Such breakage(s) in the filament 148 can release the holding force that the filament 148 had been providing against the strike pin assembly, thereby allowing for activation of the strike pin assembly. While the foregoing is discussed with respect to use of a wire or filament, according to other embodiments of the subject application, other devices, mechanisms, and/or methods can be used to trigger the release of a strike pin of the fuse assembly 102. Moreover, in addition to the above-discussed exemplary fuse, embodiments of the subject application can also be used with a variety of other, or different, types of fuse assemblies.

Figure 5:
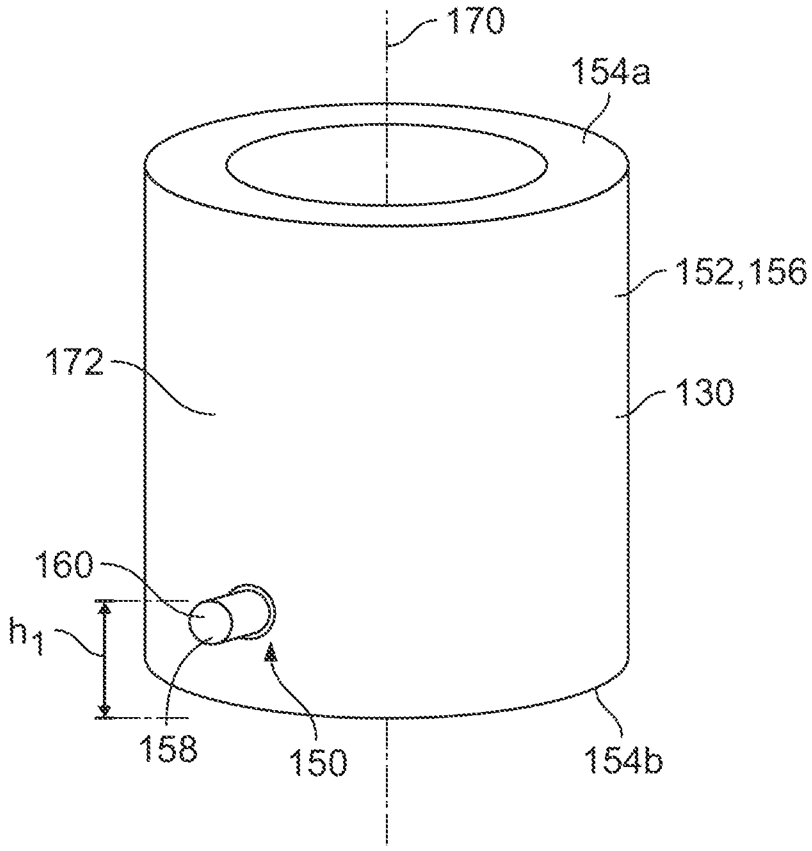
FIG. 5 illustrates a side perspective view of an end cap for an exemplary fuse assembly having a displaceable pin assembly according to an embodiment.
Figure 6:
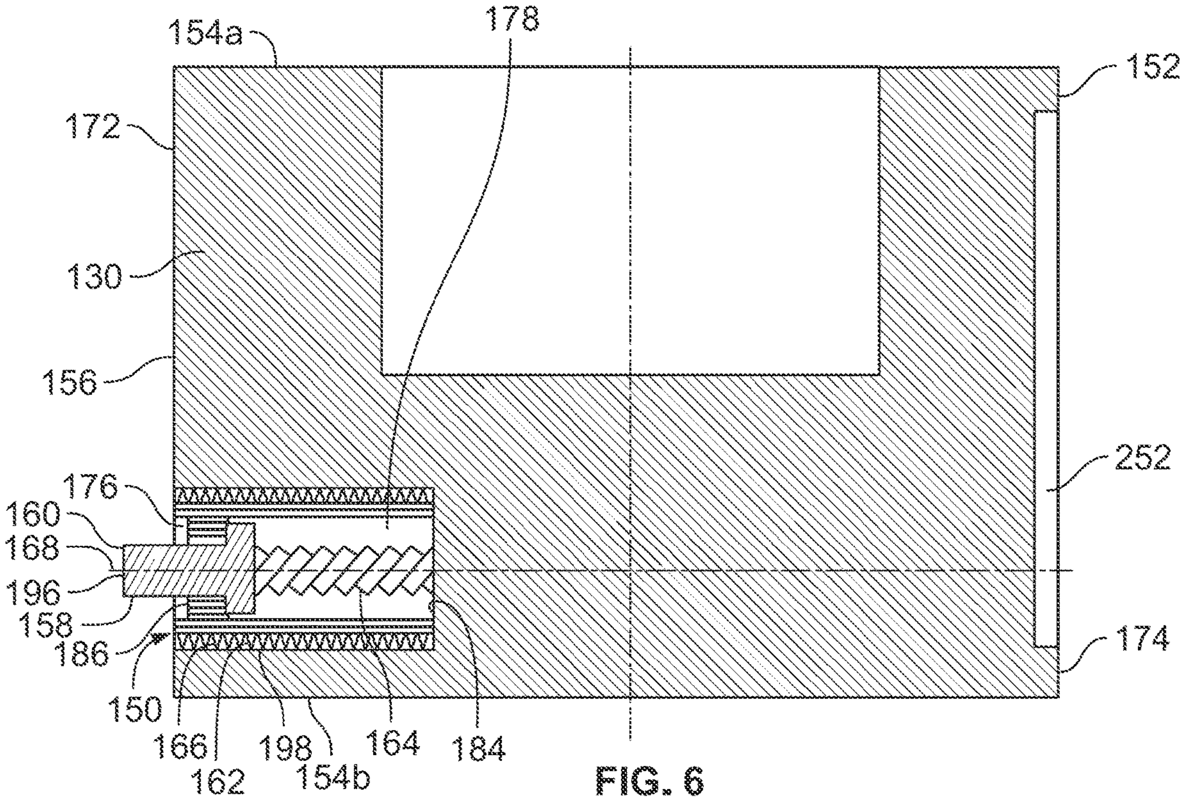
FIG. 6 illustrates a cross sectional view of an exemplary displaceable pin assembly according to an embodiment coupled to an end cap and in which a plunger of the displaceable pin assembly is outwardly biased at a first, extended position.
Figure 7:
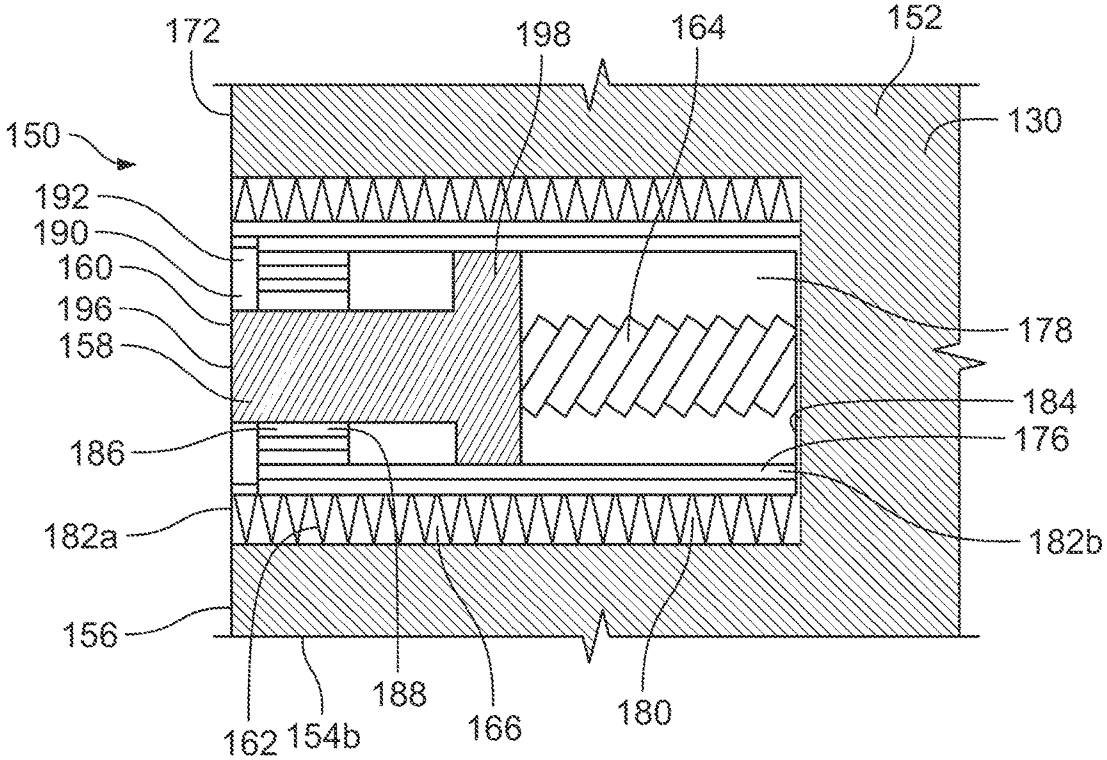
FIG. 7 illustrates a cross sectional view of the exemplary displaceable pin assembly shown in FIG. 6 in which the plunger is at a second, retracted position.

FIGS. 5-7 illustrate a displaceable pin assembly 150 of an end cap 130 for an exemplary fuse assembly 102 according to an illustrated embodiment of the present application. The end cap 130 can include a wall 152 that extends between opposing first and second ends 154*a*, 154*b* of the end cap 130. The second end 154*b* of the end cap 130 can provide an end of the fuse assembly 102, while the first end 154*a* is positioned between the second end 154*b* and the casing 140 of the fuse assembly 102. According to certain embodiments, the first end 154*a* of the end cap 130 can be generally adjacent to the casing 140. The wall 152 also includes an outer surface 156, at least a portion of which is configured to be received in the interior region 128 (FIG. 3) of the lower adapter 122. The outer surface 156 can have a size, such as, for example, a diameter or cross-sectional length, that can be similar to, if not slightly smaller than, a corresponding size, such as, for example, diameter, of the interior region 128 of the lower adapter 122. Thus, while the outer surface 156 of the wall 152 of the end cap 130 is illustrated as having a circular cross-sectional shape, the outer surface 156 can have a variety of other shapes, including, for example, hexagonal, among other polygons.

The displaceable pin assembly 150 includes a plunger 158 that is displaceable relative to the end cap 130. Moreover, as discussed below, according to certain embodiments, the plunger 158 is displaceable relative to at least the outer surface 156 of the wall 152 of the end cap 130 such that the plunger 158 can be moved from a location at which at least a first end 160 of the plunger 158 is generally flush with the wall 152 and/or inwardly recessed in the end cap 130 to a location at which at least the first end 160 of the plunger 158 outwardly protrudes, and/or is positioned away, from the outer surface 156 of the wall 152 of the end cap 130.

As seen in FIGS. 6 and 7, according to certain embodiments, the displaceable pin assembly 150 includes the plunger 158, a support body 162, and a biasing element 164, such as, for example, a spring, among other types of biasing elements. The plunger 158, support body 162, and biasing element 164 can be constructed from a variety of different types of materials, including, for example, metallic and non-metallic materials, as well as combinations thereof. For example, according to certain embodiments, the plunger 158 can be constructed from plastic, nylon, copper, or brass, among other materials. Similarly, the support body 162 can also be constructed from plastic, nylon, copper, or brass, among other materials. Further, the biasing element 164 can comprise a spring that is formed from stainless steel, plastic, or nylon, among other materials.

Figure 10:
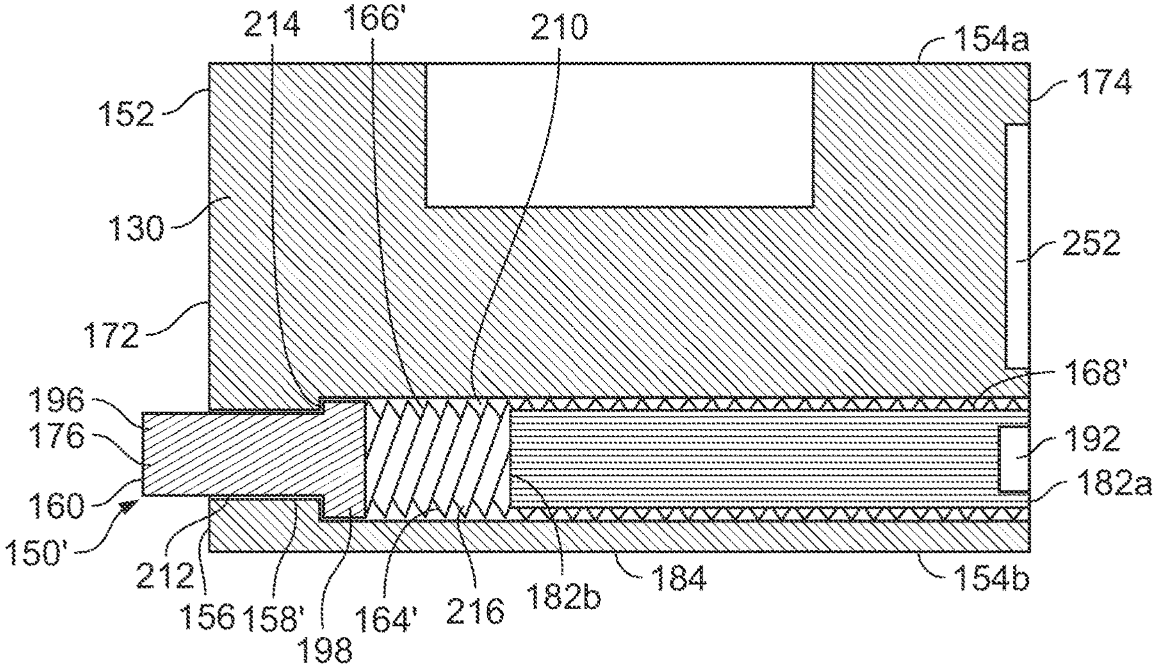
FIG. 10 illustrates a cross sectional view of another exemplary displaceable pin assembly according to an embodiment coupled to an end cap and in which a plunger of the displaceable pin assembly is outwardly biased at a first, extended position.

The end cap 130 can include a cap bore 166 that is sized to at least house the support body 162. As seen in at least FIG. 6, the cap bore 166 can inwardly extend from at least one side of the end cap 130 along a bore axis 168. According to certain embodiments, the bore axis 168 can be non-parallel to a central longitudinal axis 170 (FIG. 5) of the end cap 130. Additionally, the bore axis 168 can be generally perpendicular to, and may or may not intersect, the central longitudinal axis 170 of the end cap 130. As seen in at least FIGS. 5-7, according to certain embodiments, the cap bore 166 extends through a first side 172, but not an opposing second side 174, of the end cap 130. Alternatively, as seen in FIG. 10, according to other embodiments, the cap bore 166 can be a through-hole that extends through both the first and second sides 172, 174 of the end cap 130.

According to the embodiment depicted in FIGS. 5-7, the support body 162 can include a housing wall 176 that can, according to certain embodiments, generally define an inner area 178 of the support body 162, the housing wall 176 extending between opposing first and second ends 182*a*, 182*b* of the support body 162. The inner area 178 can be sized to house, as well as accommodate at least linear displacement of, at least a portion of the plunger 158. As seen in at least FIG. 7, the inner area 178 can provide a first bore 180 that can extend between an end wall 184, which may be at or generally adjacent to the second end 182*b* of the support body 162, and a shoulder 186 in the inner area 178.

According to certain embodiments, the shoulder 186 can be provided by a portion of the housing wall 176 that can reduce and/or restrict a size of the inner area 178 that is adjacent to the first bore 180. The shoulder 186 can be configured to retain at least a portion of the plunger 158 within the inner area 178 of the support body 162 and/or to the limit the distance that the first end 160 of the plunger 158 can be linearly displaced in a generally outwardly direction away from the end cap 130. According to certain embodiments, the shoulder 186 can be provided by a second bore 188 of the inner area 178, the second bore 188 having a size, such as, for example, a diameter, that is smaller than a corresponding size of the first bore 180. Alternatively, the shoulder 186 can be provided by a portion of the housing wall 176 that is inwardly formed and/or deformed into the inner area 178 so as to provide a barrier or inference feature within the inner area 178. Further, according to certain embodiments, the shoulder 186 may be provided a retaining or snap ring or clip that is received in a mating groove in the housing wall 176 that extends around at least a portion of the inner area 178.

The inner area 178 of the support body 162 can include an opening 190 at a first end 182*a* of the support body 162. The opening 190 can at least provide a location at which the first end 160 of the plunger 158 can exit the inner area 178 so as to outwardly extend or projection away from the support body 162 and/or the end cap 130, as shown in FIG. 6. The opening 190 can also be sized to accommodate at least the first end 160 of the plunger 158 being received into the inner area 178 when the plunger 158 is displaced to a retracted, or displaced to a recessed position, as seen in FIG. 7.

The support body 162 can be secured to the end cap 130 and/or the cap bore 166 in a variety of manners. For example, according to certain embodiments, the outer surface of the housing wall 176 includes an external thread that is configured to securely engage a mating internal thread of the cap bore 166. Further, a first end 182*a* of the support body 162 can have an engagement portion 192, such as, for example, a slot, that can receive a tool, such as, for example, a screwdriver, that can be used to drive or displace the support body 162 into the cap bore 166. Alternatively, or additionally, an adhesive material can be used to secure the support body 162 within the cap bore 166 of the end cap 130. Further, according to certain embodiments, an adhesive material can be positioned around portions of an external thread of the support body 162 that forms a bond between at least a portion of the external thread of the support body 162 and an adjacent portion of the internal thread of the cap bore 166.

Further, according to certain embodiments, the housing wall 176 can have a size, such as, for example, an outer diameter, that accommodates the housing wall 176 being secured within the cap bore 166 via a press or interference fit between the housing wall 176 and the cap bore 166.

The plunger 158 can extend from the first end 160 of the plunger 158 to a second end 194 of the plunger 158, and can have a variety of shapes and configurations. According to certain embodiments, the plunger 158 can be sized for linear displacement of at least a portion of the plunger 158 within the inner area 178 of the support body 162. Further, at least a portion of the plunger 158 can be sized so as to engage the shoulder 186 of the support body 162 in a manner that can at least assist in retaining at least a portion of the plunger 158 within the support body 162. For example, as seen in at least FIG. 6, according to certain embodiments, the plunger 158 has a first portion 196 at least at the first end 160 of the plunger 158 that is sized to pass through the opening 190 of the inner area 178 of the support body 162, and a second, larger portion 198 that can be slidingly displaced within the first bore 180 of the inner area 178. The second portion 198 can thus have a size, such as, for example, an outer diameter, that is larger than a corresponding size of the first portion 196 of the plunger 158 such that the second portion 198 can engage the shoulder 186 of the support body 162 in a manner that can assist in retaining at least a portion of the plunger 158 within the support body 162. Further, according to certain embodiments, the second portion 198 can have a size, such as, for example, outer diameter, that is similar to a size of the first bore 180 of the inner area 178, such as, an inner diameter, such that linear displacement of the plunger 158 within the inner area 178 can be guided by the second portion 198. While the second portion 198 is illustrated as extending to the second end 194 of the plunger 158, according to other embodiments, the second portion 198 can be offset from the second end 194 of the plunger 158. Further, the second portion 198 can have a variety of shapes and configurations, including, for example, being a flange or comprising one or more protrusions that outwardly extend relative to at least an outer surface or circumference of the first portion 196 of the plunger 158.

The biasing element 164, which can be optional, can, according to certain embodiments, be configured to outwardly bias the plunger 158 to a first, extended position, as seen in FIG. 6. According to such an embodiment, at least a portion of the biasing element 164, such as, for example, a spring, can be positioned between a second end 182*b* of the support body 162 and a second end 194 and/or second portion 198 of the plunger 158. For example, according to the illustrated embodiment, the biasing element 164 can be housed within the first bore 180 of the inner area 178 of the support body 162 and positioned against both the end wall 184 of the support body 162 and the second end 194 and/or second portion 198 of the plunger 158.

Figure 8:
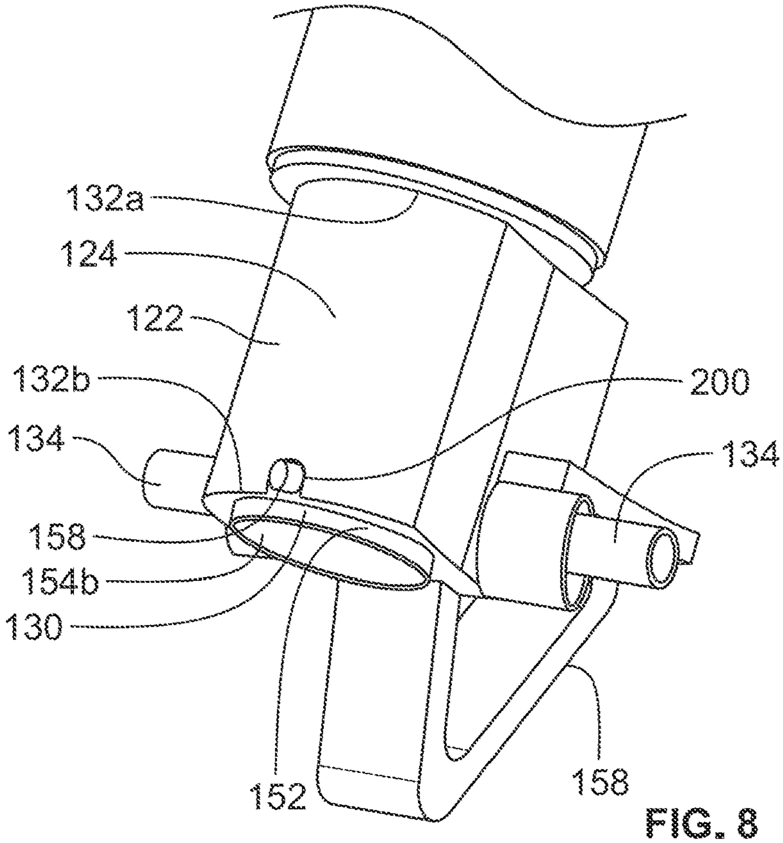
FIGS. 8 and 9 illustrate a side perspective view and a bottom view, respectively, of a lower casting or adapter of a fuse cutout assembly coupled to an exemplary end cap of a fuse assembly the subject application.
Figure 9:
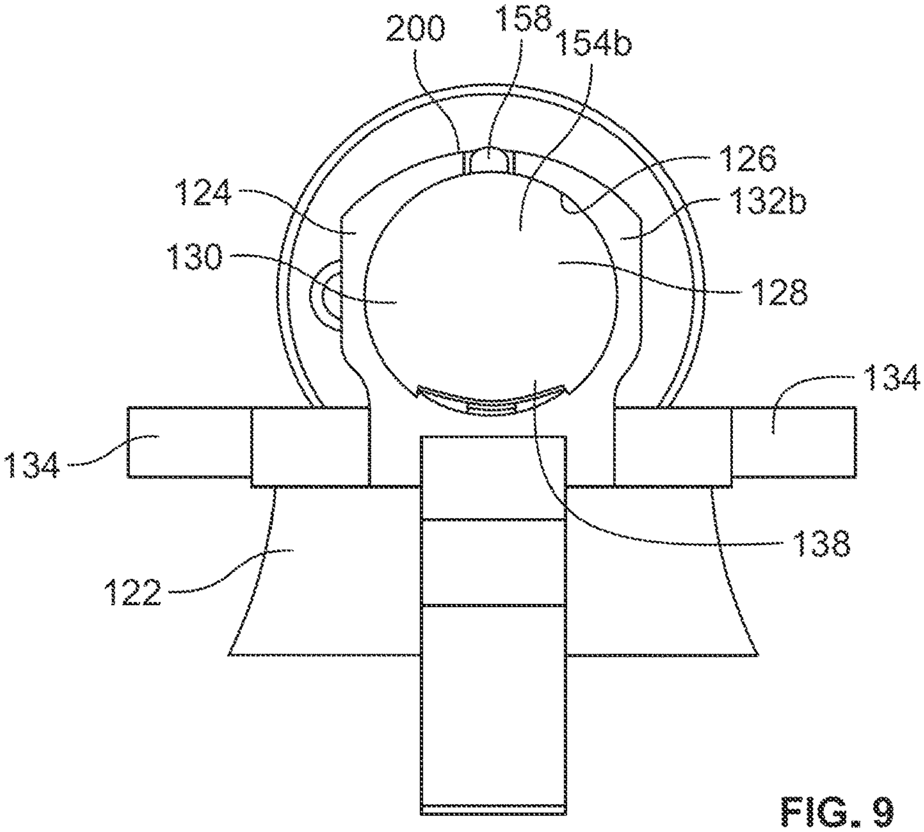

The cap bore 166 of the end cap 130 and the displaceable pin assembly 150 can be positioned about the end cap 130, and/or be configured, such that, at least when the plunger 158 is at the first, extended position, the first end 160 of the plunger 158 can extend into, if not protrude through, a notch 200 (e.g., an opening, etc., shown in FIG. 4) in an adjacent side of the lower adapter 122, as seen, for example, in at least FIGS. 8 and 9. The notch 200 in the lower adapter 122 and the displaceable pin assembly 150 can each be positioned in a manner that corresponds to a particular, selected alignment of at least the lower adapter 122 relative to the fuse assembly 102 and/or the upper adapter 118. For example, the alignment of the fuse assembly 102 relative to the lower adapter 122 can be selected such that the plunger 158 of the end cap 130 extends into the notch 200 of the lower adapter 122 when a particular relative rotational and/or linear alignment is attained between the lower adapter 122 and the fuse assembly 102. When attained, such alignment can also correspond to the upper and lower adapters 118, 122 being in rotational and/or linear alignment with each other about the fuse assembly 102 such that, when the fuse assembly 102 is to be coupled to the cutout body 104, the upper and lower adapters 118, 122 are in proper orientation and placement for being coupled to the mating upper and lower couplings 115, 116 of the cutout body 104.

Figure 4:
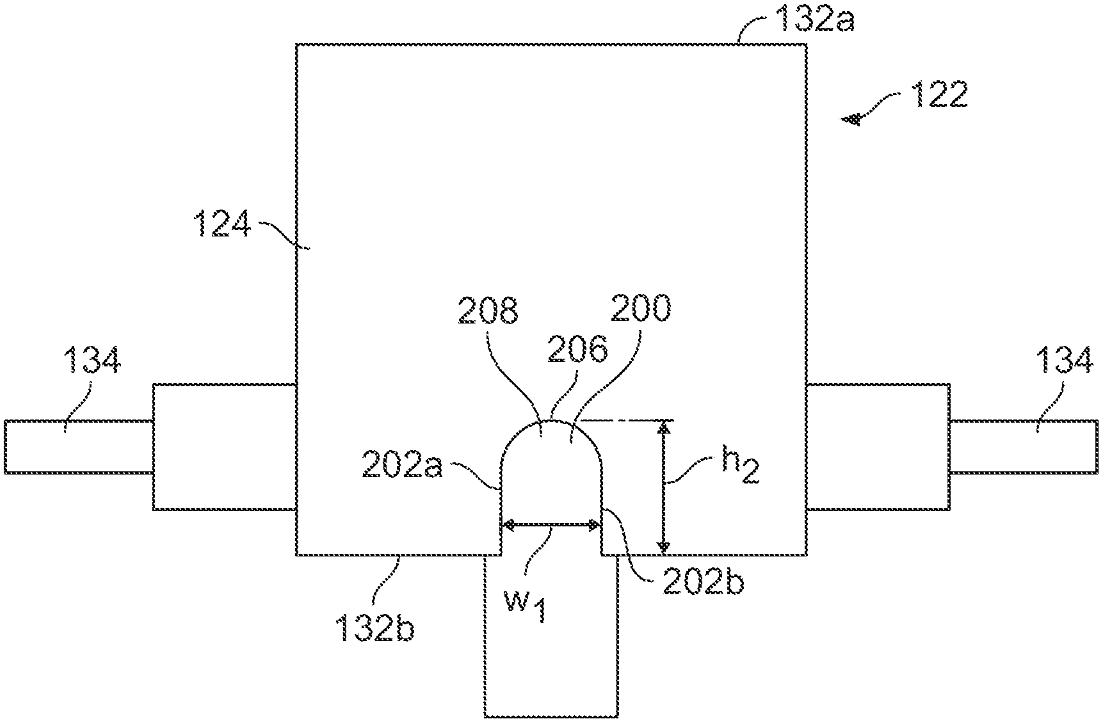

As seen in at least FIG. 4, the notch 200 in the wall 124 of the lower adapter 122 can include a pair of opposing sidewalls 202*a*, 202*b* that are adjoined by a top wall 206 of the notch 200, the sidewalls 202*a*, 202*b* and top wall 206 generally defining an aperture 208 of the notch 200. Further, the notch 200 can upwardly extend through the second end 132*b* of the wall 124 of the lower adapter 122 in a direction generally toward the first end 132*a* of the wall 124. Thus, according to certain embodiments, the aperture 208 of the notch 200 may, or may not, provide an opening that extends through the second end 132*b* of the wall 124, and which is in fluid communication with the aperture 208.

The sidewalls 202*a*, 202*b* of the notch 200 can extend in a direction that is, at least when the end cap 130 is secured in the lower adapter 122, generally parallel to the central longitudinal axis 170 of the end cap 130. As illustrated, the central longitudinal axis 170 can extend through the opposing first and second ends 132*a*, 132*b* of the wall 124 of the lower adapter 122, the first end 132*a* being generally adjacent to the casing 140. As indicated by FIG. 4, the sidewalls 202*a*, 202*b* can be separated from each other such that the aperture 208 of the notch 200 has a width (as generally indicated by "w1" in FIG. 4) therebetween that is a larger than a corresponding width of at least the portion of the plunger 158 that will extend through and/or into, the notch 200. Such a width of the aperture 208 of the notch 200 can provide clearance so as to prevent adjacent portions of the wall 124 of the lower adapter 122 from interfering with the displacement of the plunger 158 at least into the aperture 208. However, such differences between the width of the aperture 298 and the corresponding size, such as, for example, a diameter, of the plunger 158, can be relatively minimal so as to minimize, and/or prevent, rotation of the end cap 130 relative to the lower adapter 122 at least when the plunger 158 is positioned in the aperture 208 of the notch 200. Moreover, each of the sidewalls 202*a*, 202*b* can be proximately adjacent to the extended plunger 158 such that rotation of the end cap 130, and thus fuse assembly 102, relative to the lower adapter 122 may be minimized, if not prevented, by the plunger 158 contacting an adjacent sidewall 202*a*, 202*b*. Such a configuration can assist in generally maintaining an alignment of the lower adapter 122 relative to the end cap 130, and thus the fuse assembly 102, and/or maintaining the lower adapter 122 at a location at which the lower adapter 122 will be properly aligned with the upper adapter 118.

According to certain embodiments, when extended from the second, retracted position (FIG. 7) to the first, extended position, an upper side of the plunger 158 can be positioned at a vertical height (as generally indicated by "h1" in FIG. 5) to be adjacent to, and/or abut, a top wall 206 of the notch 200. According to such embodiments, such positioning of the extended plunger 158 relative to a corresponding vertical position (as generally indicated by "h2" in FIG. 4) of the top wall 206 of the notch 200 can, at least temporarily, allow the plunger 158 to provide at least a degree of support to the lower adapter 122 and/or assist with providing a particular linear alignment of the end cap 130, and thus fuse assembly 102, relative to at least the lower adapter 122. Further, such relative positioning of the extended plunger 158 and the top wall 206 of the notch 200 can provide a barrier between the extended plunger 158 and the top wall 206 of the notch 200 that can limit, and/or prevent, linear displacement of the end cap 130 in a direction generally from the second end 132*b* toward the first end 132*a* of the lower adapter 122, and thereby limit or prevent associated displacement of the fuse assembly 102, as well as assist in attaining a particular relative linear alignment of the lower adapter 122 relative to at least the end cap 130. Additionally, the presence of the extended plunger 158 within at least a portion of the notch 200 can provide a visual indication to the installer as to the lower adapter 122 being at a desired angular orientation and/or alignment relative to at least the end cap 130 and/or fuse assembly 102. Further, as seen in at least FIGS. 4 and 5, according to certain embodiments, at least the first end 160 of the plunger 158 can have a size and configuration, such as, for example, curvature, that corresponds to a similar configuration of the top wall 206.

Referencing FIG. 4, at least certain types of fuse assemblies 102 are, or can be, received into the interior region 128 of the lower adapter 122 by the end cap 130 entering into the interior region 128 of the lower adapter 122 from the first end 132*a* of the lower adapter 122. In such situations, the end cap 130 is inserted into the interior region 128 from the first end 132*a* of the lower adapter 122 and moves at least in the general direction toward the second end 132*b* of the lower adapter 122. However, as shown in FIG. 4, the notch 200 of the illustrated exemplary lower adapter 122 does not extend to the first end 132*a* of the lower adapter 122. Thus, in such situations, insertion of the end cap 130 into the interior region 128 can include the plunger 158 being at the second, retracted position, as shown in FIG. 7, such that the plunger 158 is not positioned to interfere with insertion of the end cap 130 into the interior region 128 of the lower adapter 122. Further, according to embodiments in which the displaceable fuse assembly 102 includes a biasing element 164 that is configured and/or positioned to outwardly bias the plunger 158 toward the first, extended position, insertion of the end cap 130 into the interior region 128 of the lower adapter 122 can include exerting a force against the plunger 158 that can overcome the biasing force of the biasing element 164 in a manner that displaces the plunger 158 to the second, retracted position. Such force can be applied, for example, by a digit of an installer, prior to the plunger 158 contacting, or, alternatively as the plunger 158 is coming into contact with, the first end 132*a* of the wall 124 of the lower adapter 122 such that the plunger 158 is retracted to a position that will not interfere with the continued displacement of the end cap 130 into the interior region 128 of the lower adapter 122.

As the recessed plunger 158 enters interior region 128 of the lower adapter 122, the recessed plunger 158 can abut an opposing inner surface 126 of the wall 124 of the lower adapter 122 such that the plunger 158 generally remains at the second, retracted position. Referencing FIG. 7, at the second, retracted position, the first end 160 of the plunger 158 can be relatively flush or even with the outer surface 156 of the wall 152 of the end cap 130 such that the first end 160 of the plunger 158 is generally not outwardly extending away from the plunger 158. According to the illustrated embodiment, at the second, retracted position, substantially all, if not all, of the first and second portions 196, 198 of the plunger 158 can each be housed within the interior area 178 of the support body 162. Accordingly, the second end 194 of the plunger 158 can be inwardly positioned within the inner area 178 of the support body 162 to a location that can displace the biasing element 164 into a generally compressed state, as seen in FIG. 7. Further, with the second end 194 of the plunger 158 inwardly positioned within the inner area 178 of the support body 162, the second portion 198 of the plunger 158 can be generally remote from the shoulder 186 within the inner area 178 of the support body 162.

The operator can continue to insert the end cap 130 into the interior region 128 of the lower adapter 122, and/or adjust an angular position of the lower adapter 122 relative to the inserted end cap 130, until the displaceable pin assembly 150 is aligned with the notch 200 such that at least the first end 160 of the plunger 158 can extend into and/or through the aperture 208 of the notch 200. Upon the displaceable pin assembly 150 being displaced into alignment with the notch 200, the wall 124 of the lower adapter 122 may no longer retain the plunger 158 at the second, retracted position. Thus, according to the illustrated embodiment, the biasing element 164 can be released from a generally compressed state (FIG. 7) to a generally uncompressed state, as seen in FIG. 6. As the biasing element 164 is uncompressed, the biasing element 164 can provide a force that at least linearly displaces the plunger from the second, retracted position to the first, extended position, as seen in at least FIG. 6. Moreover, such displacement of the plunger 158 can result in at least a portion of the first end 160 and/or first portion 196 of the plunger 158 extending into, and possibly through, the aperture 208 of the notch 200, as seen in FIGS. 8 and 9. Further, according to the illustrated embodiment, as the plunger 158 is outwardly displaced, the second portion 198 of the plunger 158 can come into contact with the shoulder 186 within the inner area 178 of the support body 162 in a manner that can stop, or limit the extent of, the outward displacement of the plunger 158.

In the event the lower adapter 122 is to be removed from the end cap 130, and thus removed from the fuse assembly 102, the plunger 158 can again be depressed, such as, for example, by a digit of the installer, such that the plunger 158 is displaced from the first, extended position to the second, retracted position. The plunger 158 can then be retracted from the aperture 208 of the notch 200 and into the support body 162 such that the plunger 158 is not at a position to interfere with removal of the lower adapter 122 from the end cap 130, or vice versa.

FIG. 10 illustrates a cross sectional view of another exemplary displaceable pin assembly 150' according to an illustrated embodiment of the present application. Unlike the displaceable pin assembly 150 shown in FIGS. 6 and 7, the plunger 158' of the displaceable pin assembly 150' shown in FIG. 10 is housed within the cap bore 166, and not within the support body 162'. Further, optionally, according to certain embodiments the cap bore 166' can provide a through-hole that extends through both the first and second ends **154*a*, 154*b* of the end cap 130. According to certain embodiments, the cap bore 166' shown in FIG. 10 can have a configuration that is similar to the configuration of the inner area 178 of the support body 162' that is depicted in at least FIGS. 6 and 7. Moreover, the cap bore 166' shown in FIG. 10 can provide a first bore 210 that can extend from, or be generally adjacent to, the second end 154*b* of the end cap 130 to a second bore 212 of the cap bore 166'. The second bore 212 can have a size, such as, for example, diameter, that is different than a corresponding size of the first bore 210 so as to provide a shoulder 214 within the cap bore 166' at the location at which the cap bore 166' transitions between the first and second bores 210, 212. Further, at least a portion of the cap bore 166' can be configured to receive secure placement of the support body 162' within the cap bore 166', such as, for example, via a threaded engagement between external threads of the support body 162' and internal threads of the cap bore 166' and/or an adhesive, among other manners of attaining a secure placement of the support body 162' within the cap bore 166'**.

Similar to the previously discussed displaceable pin assembly 150' embodiment, the displaceable pin assembly 150' can include a biasing element 164', such as, for example, a spring, that can be configured and/or positioned to outwardly bias the plunger 158' to the first, extended position, as seen in FIG. 10. According to certain embodiments, the biasing element 164' can be in an area within the cap bore 166' that is between an end wall 184 of the support body 162' and the second end 194 of the plunger 158'. Thus, similar to the plunger 158', the biasing element 164' can be positioned at a location outside of the support body 162'. Additionally, a space 216 between the end wall 184 of the support body 162' and the second end 194 of the plunger 158' can be sized, such as, for example, have a length, such that the space 216 can accommodate both placement of the biasing element 164' and sufficient inward displacement of the plunger 158' into the space 216 so as to accommodate displacement of the plunger 158' to the second, recessed position. Moreover, the space 216 can be sized to accommodate displacement of the plunger 158' into the space 216 such that the first end 160 of the plunger 158' can be moved into, or adjacent to, the cap bore 166 so as to be relatively flush or even with the outer surface 156 of the wall 152 of the end cap 130 when the plunger 158' at the second, retracted position.

Figure 11:
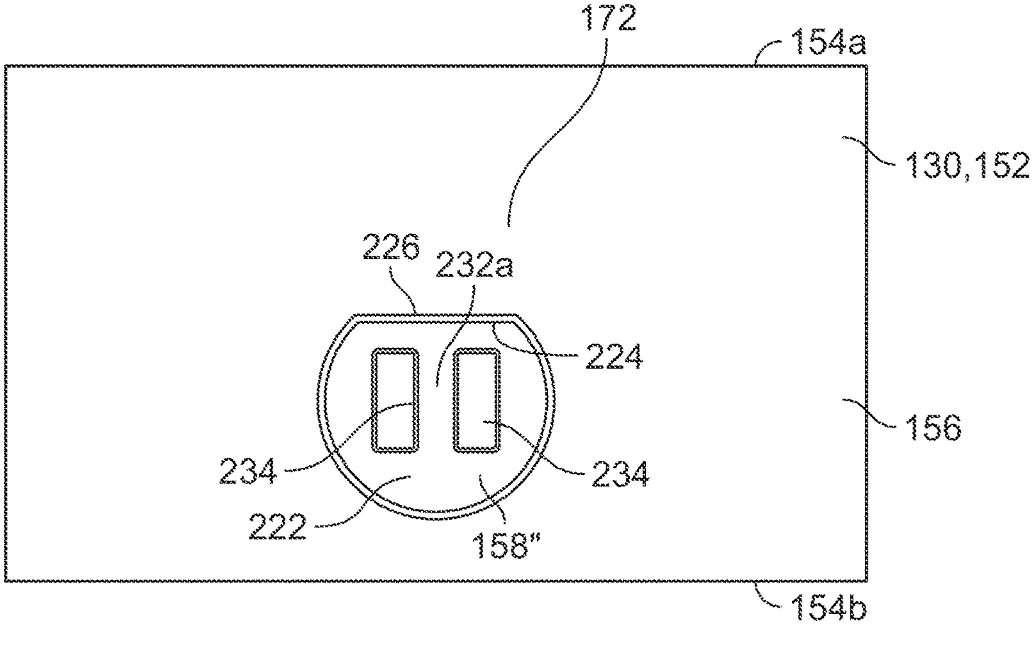
FIG. 11 illustrates a side view of an end cap portion of an exemplary fuse assembly having a displaceable pin assembly according to an embodiment and in which a plunger of the displaceable pin assembly is at a first, unlocked angular orientation.
Figure 12:
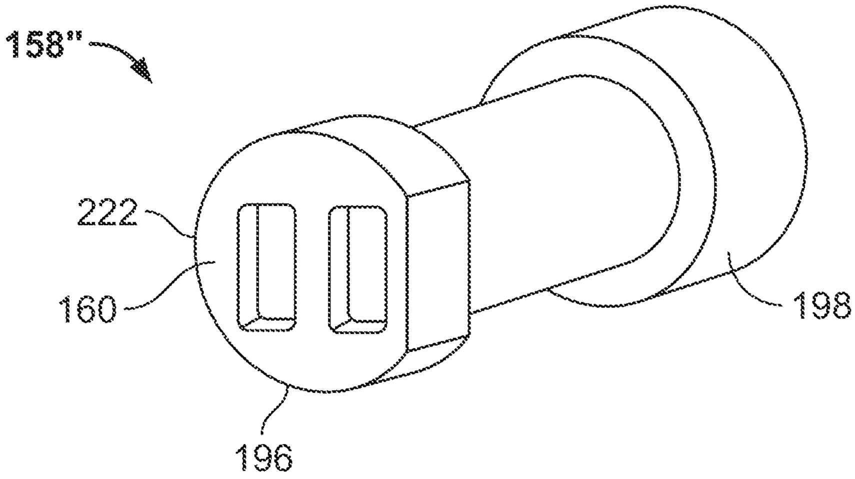
FIG. 12 illustrates an exemplary plunger for the displaceable pin assembly shown in FIG. 11.
Figure 13:
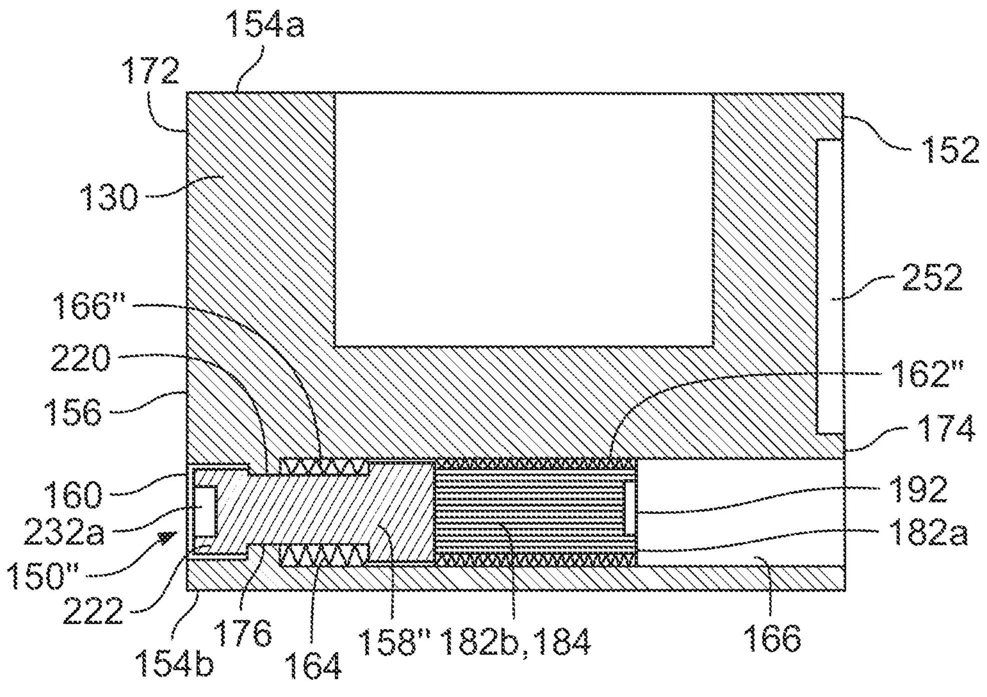
FIG. 13 illustrates a cross sectional view of an embodiment of the displaceable pin assembly shown in FIGS. 11 and 12 in which the plunger is at a first, retracted and unlocked position.

FIGS. 11-14 illustrate another exemplary embodiment of a displaceable pin assembly 150" in which, in addition to being linearly being displaced between first and second positions, the plunger 158" is rotatable to lock, or unlock, a plunger 158" at/from the first, extended position. The displaceable pin assembly 150" can include the plunger 158" and a support body 162". As seen in FIGS. 13 and 15, similar to the embodiment shown in at least FIG. 10, according to certain embodiments, the plunger 158" can be housed within the cap bore 166 but outside of the support body 162". Further, the support body 162" can be positioned within the cap bore 166 relative to the plunger 158" so as to provide a space 218 that can receive at least a portion of the plunger 158" as the plunger 158" is displaced from the first, extended position (FIG. 13) to the second, retracted position (FIG. 15). The space 218 can be sized such that the first end 160 of the plunger 158" can be relatively flush or even with the outer surface 156 of the wall 152 of the end cap 130 when the plunger 158" is displaced to the second, retracted position. The support body 162" can further be positioned to limit the distance the plunger 158" can inwardly travel when being displaced to the second, retracted position. Further, at least a portion of the support body 162", as well as at least a portion of the cap bore 166, can be configured to securely place the support body 162" within the cap bore 166, such as, for example, via a threaded engagement between external threads of the support body 162" and internal threads of the cap bore 166 and/or an adhesive, among other manners of attaining a secure placement of the support body 162" within the cap bore 166.

Additionally, or optionally, the displaceable pin assembly 150" can include a biasing element 164". According to certain embodiments, the biasing element 164" can provide an inwardly biasing force that biases the plunger 158" to the second, retracted position. For example, as seen in at least FIG. 13, the biasing element 164" can be a spring that is positioned between the shoulder 220 within the cap bore 166 and a second portion 198 of the plunger 158" such that the biasing element provides a force that seeks to retract the plunger 158" into the cap bore 166.

Figure 14:
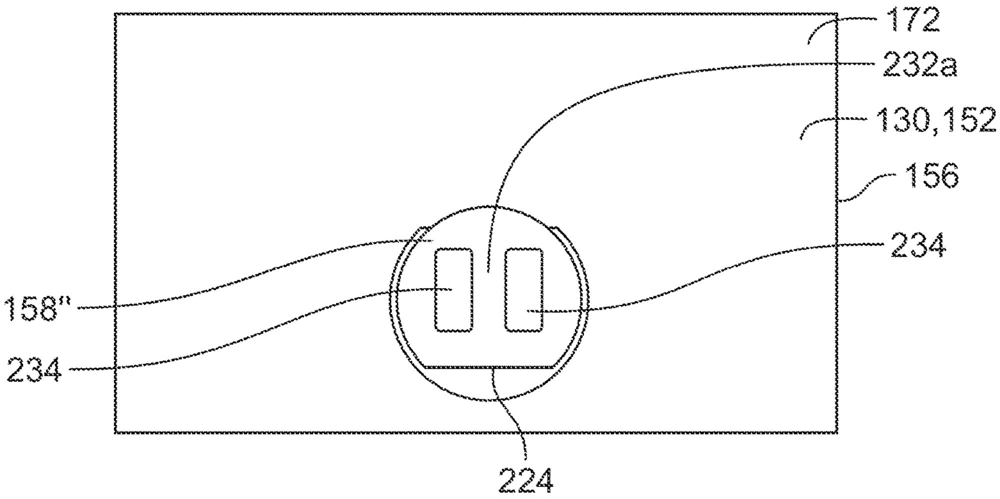
FIG. 14 illustrates a side view of the end cap and displaceable pin assembly shown in FIG. 11 and in which the plunger has been rotated to a second, locked angular orientation.
Figure 15:
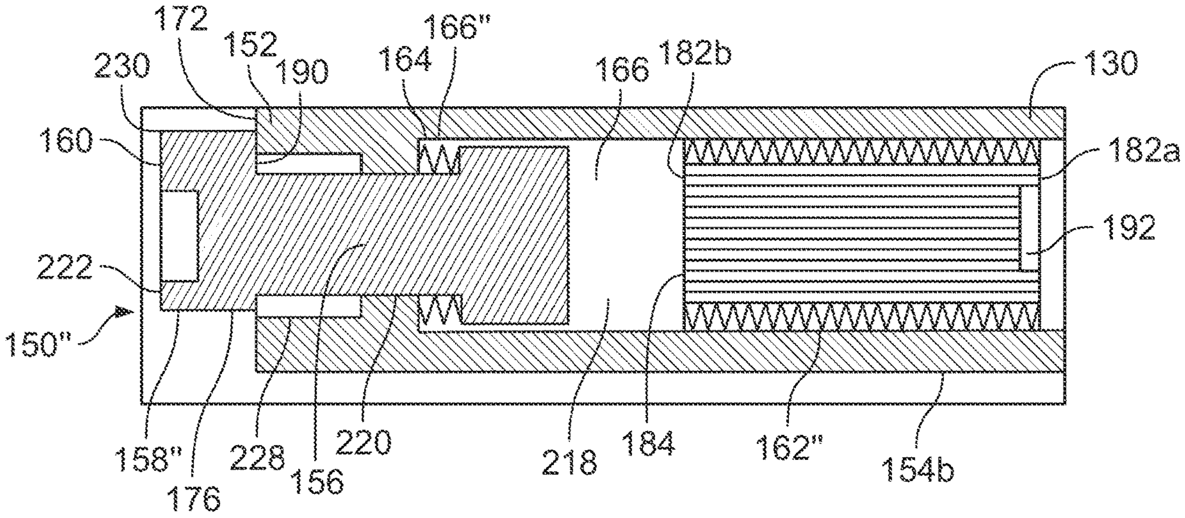
FIG. 15 illustrates a cross sectional view of the displaceable pin assembly shown in FIG. 14 in which the plunger is at a second, extended and locked position.

Referencing FIGS. 11, 12, and 14 according to certain embodiments, the first end 160 and/or first portion 222 of the plunger 158" and a portion of the cap bore 166 can both include mating engagement sections 224, 226 that can be utilized to lock the plunger 158" generally at the first, extended position. For example, according to certain embodiments, the engagement section 224 of the plunger 158" and the engagement section 226 of the cap bore 166 can have mating geometric features that, when properly aligned, can accommodate linear displacement of the plunger 158" relative to the cap bore 166, but which when misaligned, provide an interference that prevents or limits such displacement, and thereby can generally lock the linear position of the plunger 158".

For example, as seen in at least FIG. 12, according to certain embodiments, the engagement section 224 of the plunger 158" can be an asymmetrical configuration at the first end 160 and/or first portion 196 of the plunger 158", such as, for example, a D-shaped first end 160 and/or first portion 196. Similarly, a counter bore 228 of the cap bore 166 can have an engagement section 226 having a configuration that is similar to the engagement section 224 of the plunger 158", such as, for example, a mating D-shaped bore configuration, as seen for example in FIG. 11. Thus, when the asymmetrical engagement section 224 of the plunger 158" is at an angular orientation that is aligned with the mating asymmetrical engagement section 224 of the counter bore 228, as seen in FIGS. 11 and 13, the engagement section 224 of the plunger 158" can be removed from, or received in, the counter bore 228 of the cap bore 166. However, rotation of the plunger 158" in a first direction relative to the cap bore 166 can result in misalignment engagement sections 224, 226 of the plunger 158" and cap bore 166, respectively. For example, as seen in FIGS. 14 and 15, in the illustrated embodiment, rotation of the plunger 158" about 180 degrees relative to the cap bore 166 can result in the engagement section 224 of the plunger 158" being misaligned with the mating engagement section 224 of the counter bore 228. Thus, as seen in FIGS. 14 and 15, the portion of the plunger 158" that is outside of the cap bore 166, and which is adjacent to a flat portion of the D-shaped engagement section 226 of the counter bore 228, can upwardly extend beyond the counter bore 228. At such a relative angular orientation, the extended portion of the plunger 158" can be prevented from retracting back into the cap bore 166. Instead, a rear side 230 of the engagement section 224 of the plunger 158" abuts a portion of the outer surface 156 of the wall 152 of the end cap 130 that is adjacent to the cap bore 166, thereby preventing the extended portion of the plunger 158" from returning to the second, retracted position. In such a situation, the plunger 158" can be locked at the first, extended position. In the event the plunger 158" is to subsequently return to the second, retracted position, the plunger 158" can be rotated in a second direction to realign the asymmetrical engagement section 224 of the plunger 158" with the mating engagement section 224 of the counter bore 228, the second direction of rotation being opposite of the first direction of rotation. With the engagement sections 224, 226 of the plunger 158" and cap bore 166 realigned following rotation in the second direction, the plunger 158" can again be linearly displaced to the second, retracted position, such as, for example, via a biasing force of the optional biasing element 164 and/or by a force provided by the installer.

Figure 16:
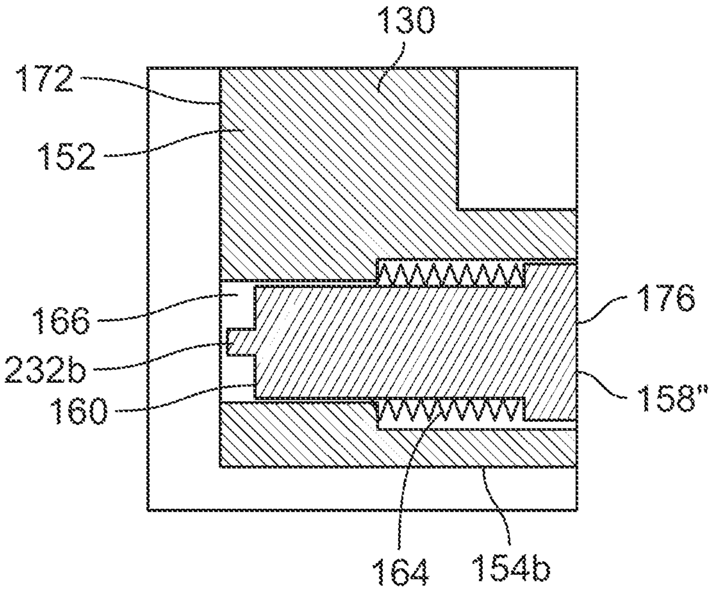
FIG. 16 illustrates a portion of a plunger of a displaceable pin assembly according to an embodiment of the subject application in which a head of a plunger includes an engagement protrusion.

Referencing FIGS. 14 and 15, the plunger 158" can include a retention body 232*a*, 232*b* that can accommodate the plunger 158" being grasped or otherwise engaged by an installer, either directly and/or through use of a tool. Such a retention body 232*a*, 232*b* can facilitate the installer linearly displacing the plunger 158", such as, for example, by providing a force against the plunger 158" that can overcome a biasing force of a biasing element 164, and/or to provide a force to rotate the plunger 158" in the first and/or second directions of rotation. According to certain embodiments, at least a portion of the retention body 232*a* can be generally inwardly recessed from, and/or flush with, the first end 160 of the plunger 158". For example, as seen in at least FIGS. 11 and 14, the retention body 232*a* can be a tab that is positioned between a pair of cavities 234 that inwardly extend from the first end 160 of the plunger 158", the tab providing areas that can be grasped by a tool, such as, for example, opposing jaws of pliers. Alternatively, as seen in FIG. 16, according other embodiments, the retention body 232*b* can be a tab can outwardly extend or protrude from the first end 160 of the plunger 158". The retention bodies 232*a*, 232*b* can also have a variety of shapes and configurations, including, but not limited to, having a generally square or rectangular cross-sectional configuration, as well as being hooked shaped, among other configurations.

Figure 17:
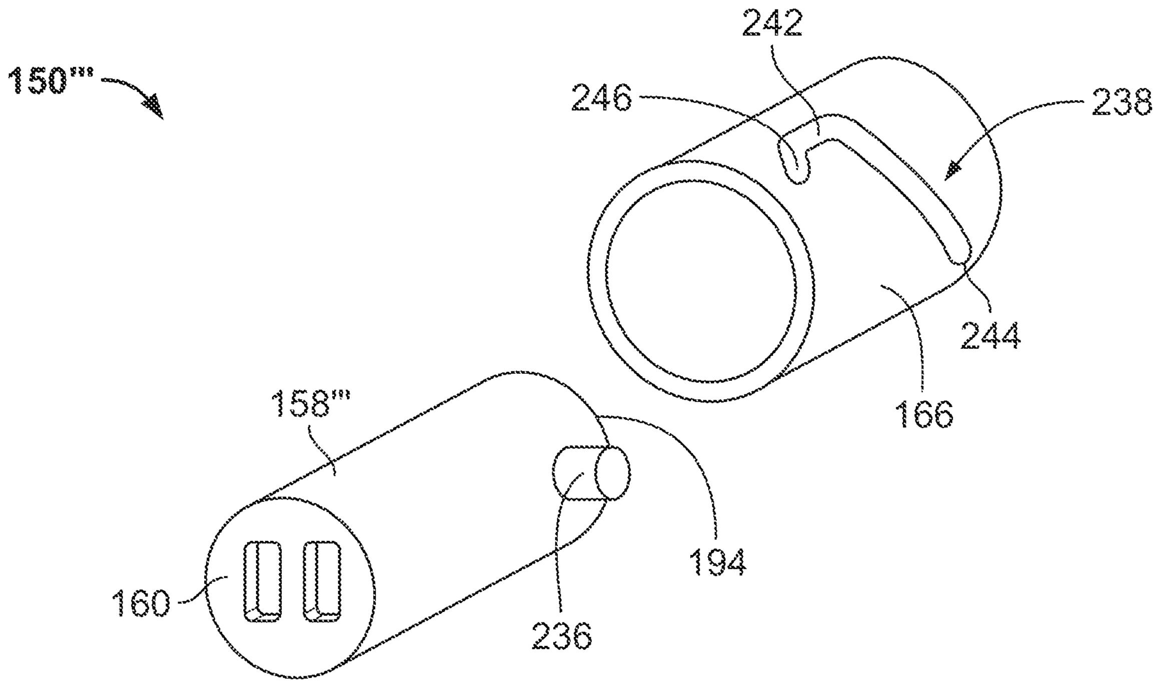
FIG. 17 illustrates a side perspective view of at least a portion of an exemplary displaceable pin assembly in which a plunger of a displaceable pin assembly includes a locking detent that mates a corresponding locking groove of the displaceable pin assembly and/or of the end cap.

FIG. 17 illustrates an alternative embodiment in which the plunger 158" is configured to be linearly displaced while being rotated from the second, retracted position to the first, extended position, and vice versa. As seen, the plunger 158" can include a locking detent 236 that extends from an outer surface of the plunger 158". According to the illustrated embodiment, the locking detent 150" can radially outwardly extend from the outer surface of the plunger 158" in a direction that is generally perpendicular to a central longitudinal axis of the plunger 158" that extends through the first and second ends 160, 194 of the plunger 158". Further, the locking detent 236 can be slidingly positioned in a locking groove 238 in the support body 162 and/or cap bore 166. The locking groove 238 can have at least a partial helical configuration such that, in response to an installer rotating the plunger 158", the locking detent 236 can be displaced within the locking groove 238 in a both rotational and a linear direction. For example, as seen in FIG. 17, the locking groove 238 can include a guide groove 240 that is positioned at least between a first end 242 and a second end 244 of the locking groove 238. According to the illustrated embodiment, the plunger 158'" can be rotated such that the locking detent 236 generally moves upwardly and outwardly along the guide groove 240, thereby resulting in associated displacement of the plunger 158" at least in the direction of the first, extended position. The length and configuration of the guide groove 240 can accommodate the plunger 158" being generally at the first, extended position when the locking detent 236 reaches the first end 242 of the locking groove 238, be at the second, retracted position when the locking detent is at the second end 244 of the locking groove 238.

One or both of the first and second ends 242, 244 of the locking groove 238 can include a retention cavity 246 that is configured to assist in retaining the locking detent 236 at the associated first or second end 242, 244 of the locking groove 238. The retention cavity(ies) 246 can be configured to extend in a direction that is different than the direction at which the adjacent portion of the guide groove 240 extends. For example, while the guide groove 240 in the illustrated embodiment extends in a generally upwardly and outwardly direction generally from, or from around, the second end 244 to the first end 242 of the locking groove 238, the retention cavity 246 at the first end 242 of the locking groove 238 generally extends from the guide groove 240 in a downward direction. Thus, removal of the locking detent 236 from the illustrated retention cavity 246 would involve rotating the plunger in a second direction so that the locking detent 236 were generally upwardly raised from the retention cavity 246. The plunger 158" may then be linearly displaced in an inwardly direction as the locking detent 236 is moved into the guide groove 240. Such inward displacement of the plunger 158" may involve overcoming an outwardly biasing force of a biasing element of the displaceable pin assembly 150", such as, for example, a biasing element similar to the biasing element 164 illustrated in at least FIG. 6, before the plunger 158". With the locking detent 236 at the guide groove 240, the plunger 158" can be rotated in a first direction so as to lower the detent 236 along the guide groove 240 in a direction generally toward the second end 244 of the locking groove 238.

Figure 3:
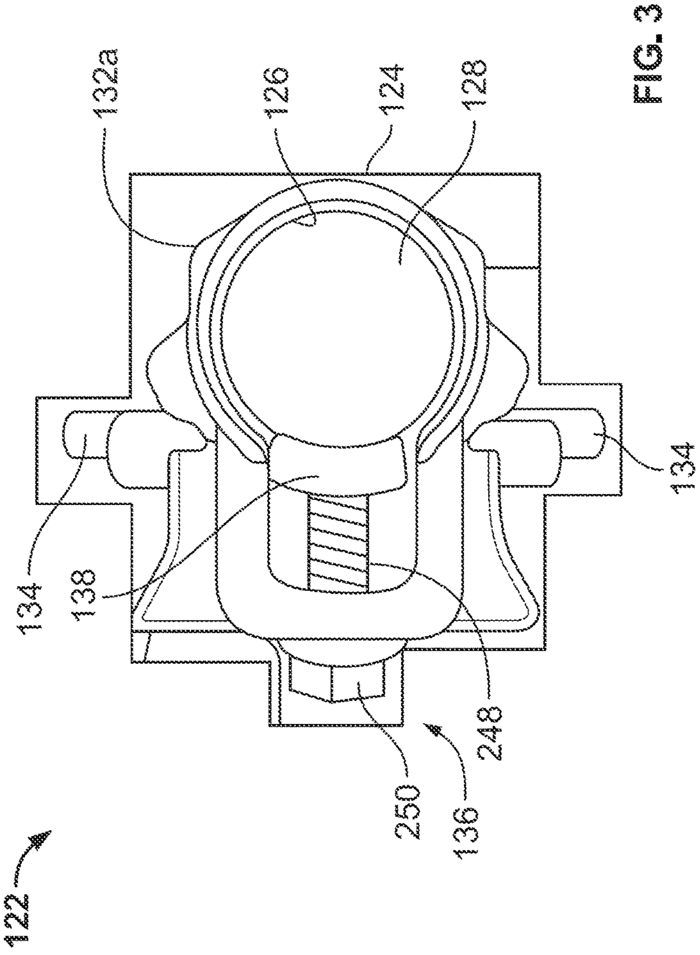
FIGS. 3 and 4 illustrate top and side views, respectively, of an exemplary lower casting or adapter according to an embodiment.

Each of the displaceable pin assemblies 150, 150', 150", 150" discussed herein, as well as variations thereof, can be utilized with other features of the end cap 130 that can assist in securing the lower adapter 122 at a particular angular orientation relative to the end cap 130. For example, as seen in FIG. 3, the lower adapter 122 can include a contact assembly 136 of that comprises a clamping plate or shoe 138, a bolt 248, and a nut 250. The wall 124 of the lower adapter 122 can include an opening through which at least a portion of the shoe 138 can be selectively displaced into a portion of the interior region 128 of the lower adapter 122 and/or displaced into contact with an adjacent portion of the second side 174 of the end cap 130 that is generally positioned within the interior region 128 of the lower adapter 122. The wall 124 of the lower adapter 122 can also include a threaded aperture through which a portion of the bolt 248 can pass through, or around, the wall 124 to selectively engage the shoe 138 with the adjacent portion of the end cap 130.

Rotational displacement of the bolt 248 can facilitate linear displacement of the shoe 138, thereby linearly displacing the shoe 138 toward and/or at least partially into, or away, from the interior region 128 of the lower adapter 122, and thus either toward or away from an adjacent second side 174 of the end cap 130 of the fuse assembly 102 that is positioned within the interior region 128. Further, depending on the direction and degree of displacement of the shoe 138, such displacement of the shoe 138 can be utilized to exert a force against the end cap 130 of the fuse assembly 102 that clamps, or otherwise secures, the lower adapter 122 to the fuse assembly 102, or, alternatively, to release such a force from the end cap 130.

Figure 18:
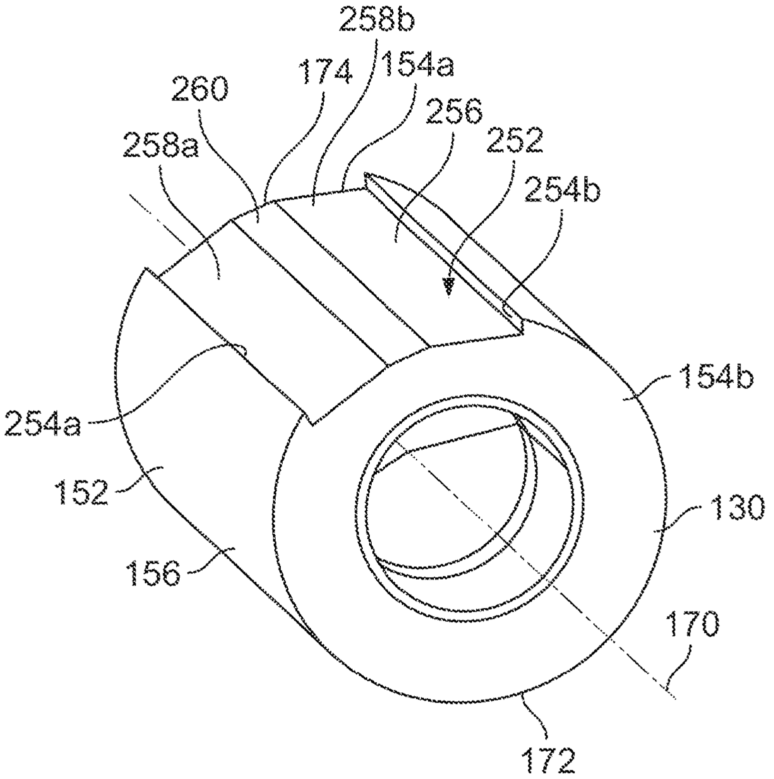
FIG. 18 illustrates a front side perspective view of an exemplary recessed retention body for an end cap of a fuse assembly according to an embodiment.
Figure 19:
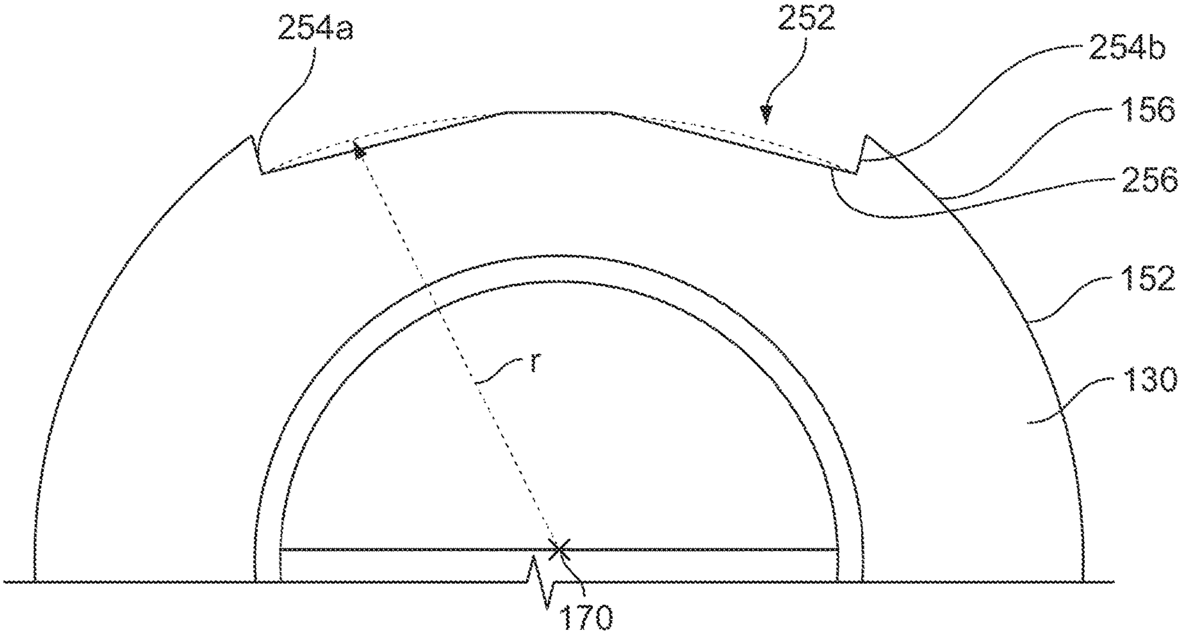
FIG. 19 illustrates a bottom view of the recessed retention body shown in FIG. 18 with and an indication of an exemplary mating arc having a radius corresponding to a radius of an inner wall of an exemplary shoe.
Figure 20:
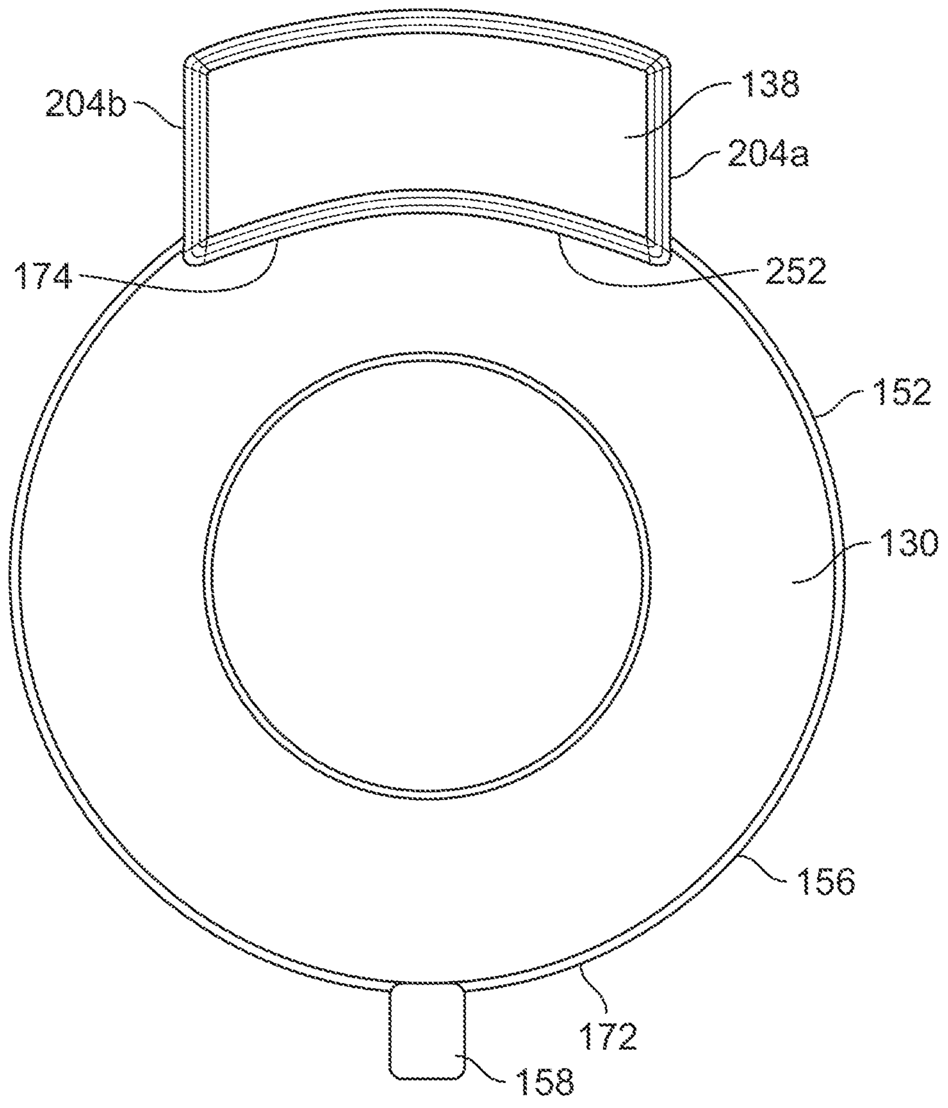
FIG. 20 illustrates a bottom view of a shoe of a lower casting or adapter engaged with the recessed retention body shown in FIG. 18 according to an embodiment.

Referencing FIGS. 18-20, the end cap 130 of the fuse assembly 102 that is placed within the interior region 128 of the lower adapter 122 can include a recessed retention body 252 in a wall 152 of the end cap 130. The recessed retention body 252 of the end cap 130 is configured and positioned for engagement with at least a portion of an inner wall of the shoe 138. According to the illustrated embodiment, when the plunger 158, 158', 158", 158" is positioned within the notch 200 of the lower adapter 122, and thus at the first, extended position, at least a portion of the plunger 158, 158', 158", 158" is positioned between, and in relative close proximity to, the sidewalls 202*a*, 202*b* of the notch 200 so as to provide a barrier to prevent rotational displacement of the lower adapter 122 about the end cap 130 that can result in engagement between the shoe 138 and the end cap 130, including with the recessed retention body 252.

According to certain embodiments, the recessed retention body 252 includes retention walls 254*a*, 254*b* that upwardly and/or outwardly extend from an adjacent portion of an engagement surface 256 of the retention body 252 to the outer surface 156 of the wall 152 of the end cap 130. Thus, each retention wall 254*a*, 254*b* can have a size, such as, for example, length or height, between an adjacent portion of the engagement surface 256 and the outer surface 156 of the wall 152 of the end cap 130. Such a length or height of the retention walls 254*a*, 254*b* can allow the retention walls 254*a*, 254*b* to be configured to abut an adjacent sidewall of the shoe 138 in a manner that can provide a barrier that can prevent rotational displacement of the end cap 130, and thus the fuse assembly 102, along the central longitudinal axis 170 of the end cap 130 while the retention body 252 is receiving the shoe 138 and/or while the shoe 138 is being displaced in a manner in which the shoe 138 is exerting a force against the engagement surface 256 of the retention body 252.

The retention walls 254*a*, 254*b* can generally upwardly and/or outwardly extend from an adjacent portion of an engagement surface 256 of the retention body 252 to the outer surface 156 of the wall 152 of the end cap 130 in a manner that may, or may not, result in the retention walls 254*a*, 254*b* being parallel to each other. For example, as shown by the profiles of the retention walls 254*a*, 254*b* illustrated in FIG. 19, according to certain embodiments, the retention walls 254*a*, 254*b* can generally upwardly and/or outwardly extend in divergent directions from a corresponding adjacent portion of an engagement surface 256 of the retention body 252 to the outer surface 156 of the wall 152 of the end cap 130. However, the retention walls 254*a*, 254*b* can have a variety of other profiles, including, for example, profiles in which the retention walls 254*a*, 254*b* are parallel to each other.

Additionally, the retention walls 254*a*, 254*b* can extend at least along a portion of a length of the end cap 130 in a direction between the first and second ends 154*a*, 154*b* of the end cap 130. For example, as shown in FIG. 17, according to certain embodiments, the retention walls 254*a*, 254*b* can extend from the first end 154*a* to the second end 154*b* of the end cap 130 in a direction that is generally parallel to the central longitudinal axis 170 of the end cap 130. Thus, according to such an embodiment, in addition to being parallel to the central longitudinal axis 170 of the end cap 130, the retention walls 254*a*, 254*b* can be generally parallel to each other along the length of the end cap 130. However, the retention walls 254*a*, 254*b* can extend in other directions so as to conform to the orientation of the first and second sidewalls 204*a*, 204*b* (FIG. 20) of the shoe 138 that are to be positioned generally adjacent to the retention walls 254*a*, 254*b* at least when the inner wall of the shoe 138 is engaged with the engagement surface 256 of the retention body 252.

According to certain embodiment, the retention body 252 can have a width that extends between the retention walls 254*a*, 254*b* that is similar to, if not slightly larger, than a corresponding width of the shoe 138. Such similarities between the widths of the retention body 252 between the retention walls 254*a*, 254*b* and width of the shoe 138 between the sidewalls of the shoe 138 can result in the sidewalls of the shoe 138 being in relatively close proximity to. and/or abutment with, adjacent portions of the associated retention wall 254*a*, 254*b*. Further, such similarities in widths of the retention body 252 and the shoe 138, along with the barrier provided by the height or length of retention walls 254*a*, 254*b* between the outer surface 156 of the wall 152 and the engagement surface 156, can further assist in preventing and/or minimizing inadvertent rotational displacement of the end cap 130, and thus the fuse assembly 102, that may be associated with the shoe 138 exerting a force against the end cap 130 at least when the inner wall of the shoe 138 is engaged with the engagement surface 256 of the retention body 252.

The engagement surface 256 of the retention body 252 can have a variety of different configurations. For example, according to the embodiment shown in FIG. 17, the engagement surface 256 can comprise one or more first and second descending walls or segments 258*a*, 258*b* that downwardly and outwardly extend in divergent directions from opposing sides of an apex wall or segment 260 that is generally positioned along at least a midsection of the engagement surface 256. According to the illustrated embodiments, each of the one or more first and second descending walls or segments 258*a*, 258*b* and apex wall or segment 260 can be generally flat surfaces that are non-planar with each other, and are in arranged in a manner that generally provides the engagement surface 256 with a segmented convex or arc shaped surface. Thus, for example, according to the illustrated embodiment, the first and second descending walls or segments 258*a*, 258*b* may each be joined to the apex wall or segment 260 at an angle that is less than 180 degrees. The degree at which the first and second descending walls or segments 258*a*, 258*b* can each be joined to the apex wall or segment 260 can be based on a variety of different factors. For example, the engagement surface 256 of the retention body 252 can be configured to generally conform to the shape of the opposing inner surface of the shoe 138. Thus, as illustrated in FIG. 19, according to certain embodiments in which the inner wall of the shoe 138 has an inwardly curved or concave configuration, the first and second descending walls or segments 258*a*, 258*b* and apex wall or segment 260 of the engagement surface 256 can be configured and arranged in a manner that at least attempts to generally form and/or generally follow along, a outwardly curved or convex shape that is generally arranged along a radius (as indicated by "r" in FIG. 19).

As discussed above, the retention body 252 can have a length between the first and second ends 154*a*, 154*b* of the end cap 130 in a direction that is generally parallel to the central longitudinal axis 170 of the end cap 130. Such length of the retention body 252 can, for example, result in the retention body 252 extending from the first end 154*a* to the second end 154*b* of the end cap 130, as illustrated, for example, by the embodiment depicted in at least FIG. 18. According to other embodiments, such a configuration can result in the retention body 252 extending from one of the first and second ends 154*a*, 154*b* of the end cap 130 but not reaching the other of the first and second ends 154*a*, 154*b*. Alternatively, such a configuration can result in a portion of the retention body 252 extending from the first end 154*a* to the second end 154*b*, while another portion of the retention body 252 extends from one of the first and second ends 154*a*, 154*b* of the end cap 130 but does not reach the other of the first and second ends 154*a*, 154*b*.

As illustrated in FIG. 18, the end cap 130 can have a length between the first and second ends 154*a*, 154*b* of the end cap 130 that is longer than a corresponding length between at least the first and second ends 132*a*, 132*b* of the wall 124 of the lower adapter 122. Thus, when the end cap 130 is positioned and/or secured within the interior region 128 of the lower adapter 122, at least a portion of the end cap 130 can protrude from either, or both, of the first and second ends 132*a*, 132*b* of wall 124 of the lower adapter 122 and/or from the interior region 128 of the lower adapter 122. Such protruding portion(s) of the end cap 130 can be visible to the individual or installer that is securing, or has secured, the lower adapter 122 to the end cap 130 via use of shoe 138 of the contact assembly 136. Thus, according to embodiments in which the length of at least a portion of the retention body 252 in a direction generally parallel to the central longitudinal axis 170 is larger than a corresponding length of the lower adapter 122, a portion of retention body 252 can be visible from outside of the lower adapter 122.

The visually accessible portion(s) of retention body 252 can provide a visual indicator to the installer of the angular orientation of the retention body 252 relative to at least the shoe 138. Moreover, in addition to the plunger 158, 158', 158", 158" being visibly positioned in the notch 200 of the lower adapter 122, the visible portion of the retention body 252 can provide the installer with an indication of the current alignment of the retention body 252 relative to at least the shoe 138 and/or the lower adapter 122, and thus the fuse assembly 102 relative to the lower adapter 122. According to certain embodiments, the installer can use the visual confirmation of the presence of the plunger 158, 158', 158", 158' in the notch 200 and/or the indication of the relative positioning of the retention body 252 relative to at least the shoe 138 to determine, at least prior to attempting to secure the upper and lower adapters 118, 122, and thus the fuse assembly 102, to the cutout body 104, whether the angular orientation of the end cap 130 relative to the shoe 138 and/or lower adapter 122 should be adjusted.

Figure 21A:
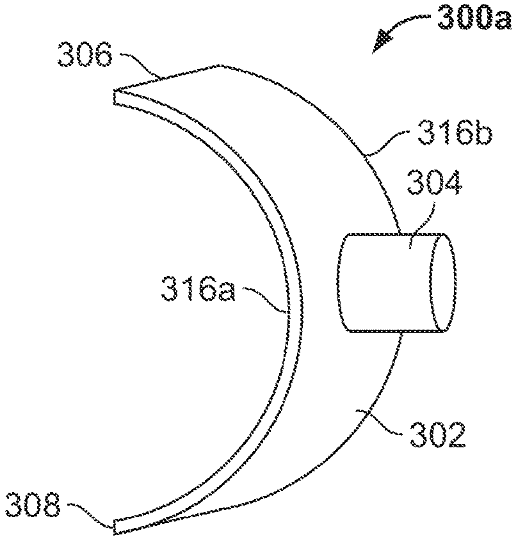
FIGS. 21A and 21B illustrate side perspective views of displaceable pin assemblies for an end cap for an exemplary fuse assembly according to an embodiment.
Figure 21B:
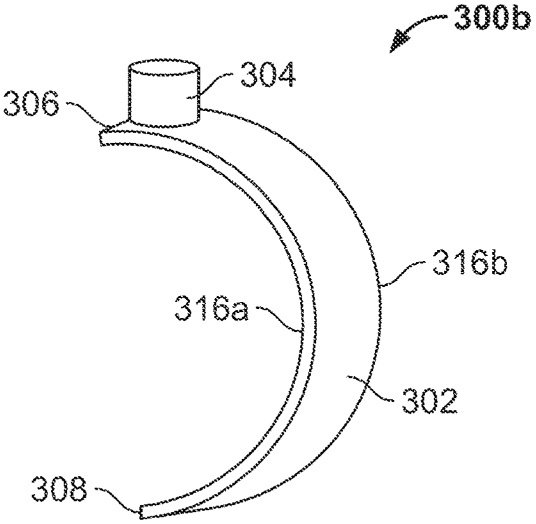

FIGS. 21A and 21B illustrate side perspective views of a displaceable pin assemblies 300*a*, 300*b* for an end cap 130 for an exemplary fuse assembly 100 according to an illustrated embodiment of the present application. As seen, the displaceable pin assemblies 300*a*, 300*b* can each include a spring body 302 and a plunger 304.

The spring body 302 can be constructed from a variety of different materials, including, for example, spring steel, among other materials. For example, according to certain embodiments, the spring body 302 can be constructed from a generally low-alloy manganese steel, medium-carbon steel, or high-carbon steel with a relatively high yield and/or tension strength. According to certain embodiments, the spring body 302 comprises a "C" or "U" shaped spring.

Additionally, according to certain embodiments, the spring body 302 may, for example, comprise a round wire or rectangular wire that is formed in "C" or "U" shape, among other shapes. Thus, for example, the spring bodies 302 illustrated for the pin assemblies 300*a*, 300*b* in FIGS. 21A and 21B can have a generally rectangular body that extends generally along a radius from a first end 306 to a second end 308 of the spring body 302 so that the spring body 302 has a curved, arced, and/or semi-circular configuration. The spring body 302 can be configured to provide a spring force that outwardly biases the plunger 304 to an extended position relative to at least the end cap 130, as discussed below.

The plunger 304 can be securely coupled to the spring body 302, such as, for example, via a mechanical fastener, adhesive, and/or weld, among other manners of securing the plunger 304 to the spring body 302. Further, the plunger 304 may, or may not, be formed form a metallic material, as well as from other materials, including, but not limited to, plastic, nylon, copper, or brass. Additionally, as illustrated, the plunger 304 can be positioned about the spring body 302 such that the plunger 304 outwardly extends away, or outwardly projects, from the spring body 302. Further, the plunger 304 can be positioned at a variety of locations about the spring body 302. For example, referencing FIG. 25A, according to certain embodiments, the plunger 304 can be positioned proximately adjacent to the first or second end 306, 308 of the spring body 302. Alternatively, as shown in FIG. 25B, according to certain embodiments, the plunger 304 can be positioned at a location that is generally midway between the first and second ends 306, 308 of the spring body 302, among other positions along the spring body 302.

Figure 22:
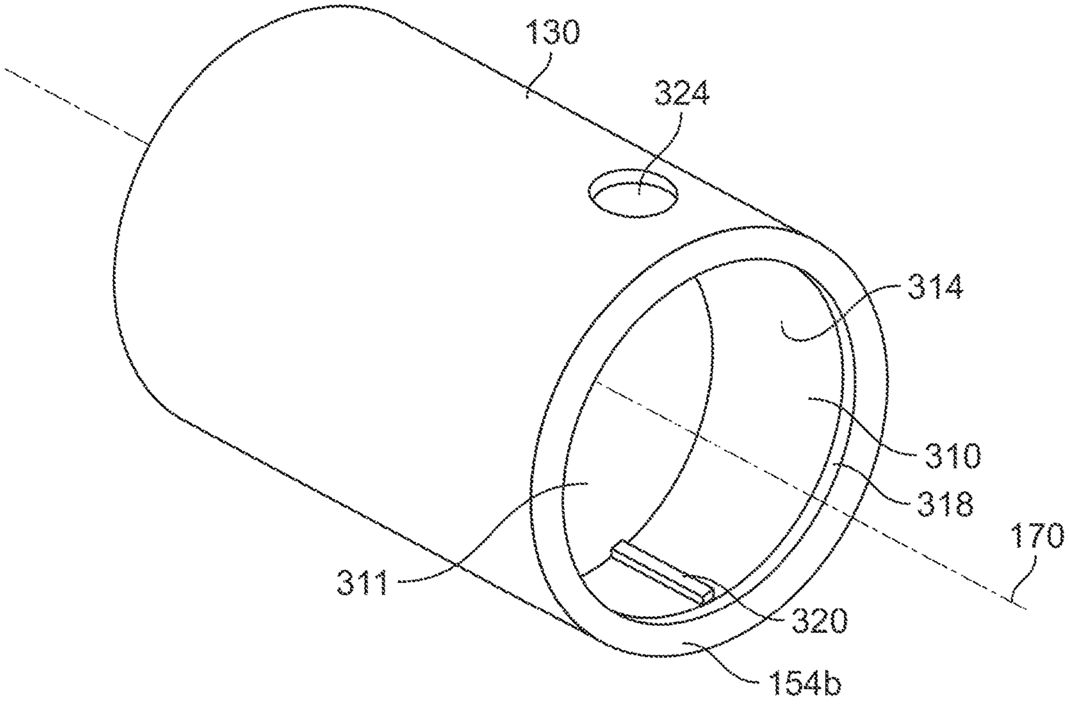
FIGS. 22 and 23 illustrates bottom side perspective view of exemplary end caps for use with at least the displaceable pin assemblies shown in FIGS. 21A and 21B.
Figure 23:
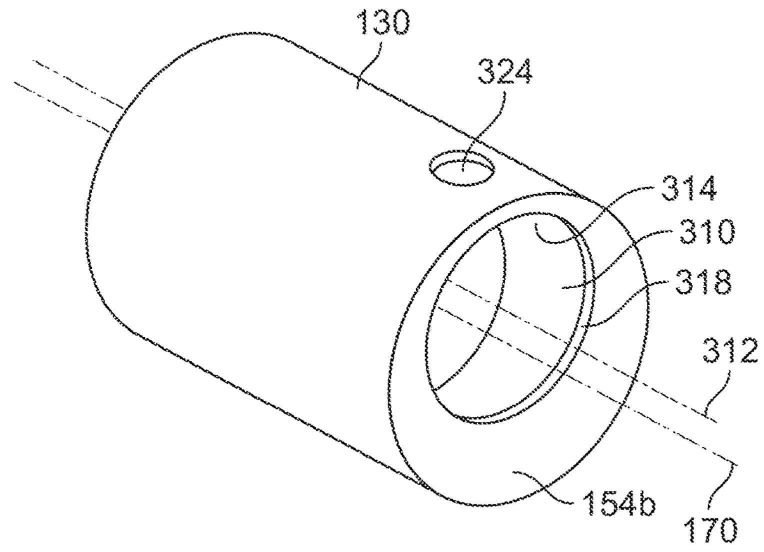

Referencing FIG. 22, the second end 154*b* of the end cap 130 can be include a cavity 310 that generally extends through second end 154*b* and in a direction generally toward the first end 154*a* of the end cap 130. Thus, the cavity 310 can be recessed into the end cap 130. According to the embodiment illustrated in FIG. 22, the cavity 310 can generally extend along the central longitudinal axis 170 of the end cap 130, and thus may be generally concentric with the end cap 130. Alternatively, as shown in FIG. 23, the cavity 310 can generally extend along a longitudinal axis 312 that is generally parallel to, but offset from, the central longitudinal axis 170 of the end cap 130 such that the cavity 310 is not concentric with the end cap 130.

The cavity 310 is sized to receive placement of, as well as accommodate a degree of compression, deformation, and/or deflection of, the spring body 302. For example, the cavity 310 can be generally defined by a cavity wall that has a size, such as, for example, diameter or radius, that corresponds to a similar size of the spring body 302 when the spring body 302 is not, or is partially in, a compressed state. Similarly, the cavity wall 314 can have a length in a direction that is generally parallel to the central longitudinal axis 170 of the end cap 130 and/or the longitudinal axis 312 of the cavity 310 that can correspond to, or be larger than, a corresponding width between opposing side walls 316*a*, 316*b* of the spring body 302.

The cavity 310 can also include a lip 318 along an opening 311 of the cavity 310 at the second end 154*b* of the end cap 130. The lip 318 can have a size, such as, for example, diameter or radius, that is smaller than the corresponding size of the cavity wall 314. Such differences in sizes between the lip 318 and the cavity wall 314 can allow the lip 318 to provide a wall, barrier, or interference, that can at least assist in preventing and/or minimizing linear displacement of the spring body 302 in a direction toward the second end 154*b* of the end cap 130. Additionally, the barrier provided by the lip 318 can assist in preventing inadvertent removal of the spring body 302, and thus the displaceable pin assembly 300*a*, 300*b*, from the cavity 310 of the end cap 130. During assembly, the spring body 302 may be compressed such that a size of the spring body 302, while compressed, is at least small enough to pass through the lip 318 and into the cavity 310 of the end cap 130.

According to certain embodiments, the cavity 310 can include one or more shoulders 320, such as, for example, a wall, protrusion, or projection, that is positioned to abut against an adjacent one of the first end 306 or second end 308 of the spring body 302. Moreover, a first shoulder 320 can be positioned along the cavity wall 314 to abut against the first end 306 of the spring body 302, and/or a second shoulder 320 can be positioned to abut against the second end 308 of the spring body 302 at a location that can prevent inadvertent rotational displacement of the spring body 302 along the cavity wall 314. Alternatively, as shown in FIGS. 25A and 25B, the cavity 310' can have a shape, such as, for example, a "D" shape, such that the cavity wall 314 includes a shoulder wall 322 that is positioned to abut one or both of the first and second ends 306, 308 of the spring body 302.

The end cap 130 can further include a cap bore 324 that extends through the outer surface 156 of the wall 152 of the end cap 130 and to the cavity 310, 310'. Thus, the cap bore 324 may be in fluid communication with the cavity 310, 310'. According to certain embodiments, the cap bore 324 can extend along an axis that is generally perpendicular to, and may or may not intersect, the central longitudinal axis 170 of the end cap 130 and/or the longitudinal axis 312 of the cavity 310, 310'. The cap bore 324 is sized to receive placement, as well as accommodate at least a degree of linear displacement, of the plunger 304.

Figure 24A:
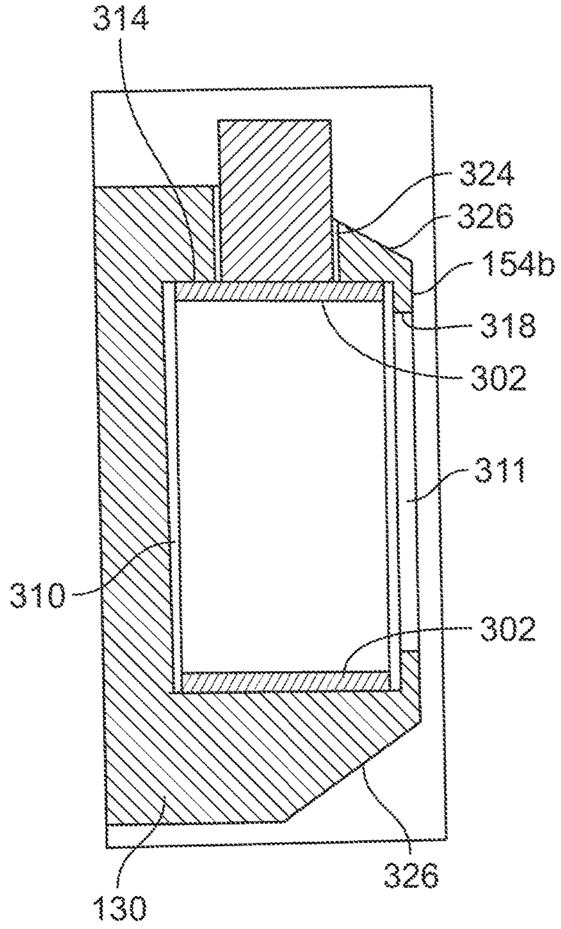
FIGS. 24A and 24B illustrate side cross sectional views of an end cap for a fuse assembly having a displaceable pin assembly in an extended position and a retracted position, respectively, according to an embodiment.
Figure 25A:
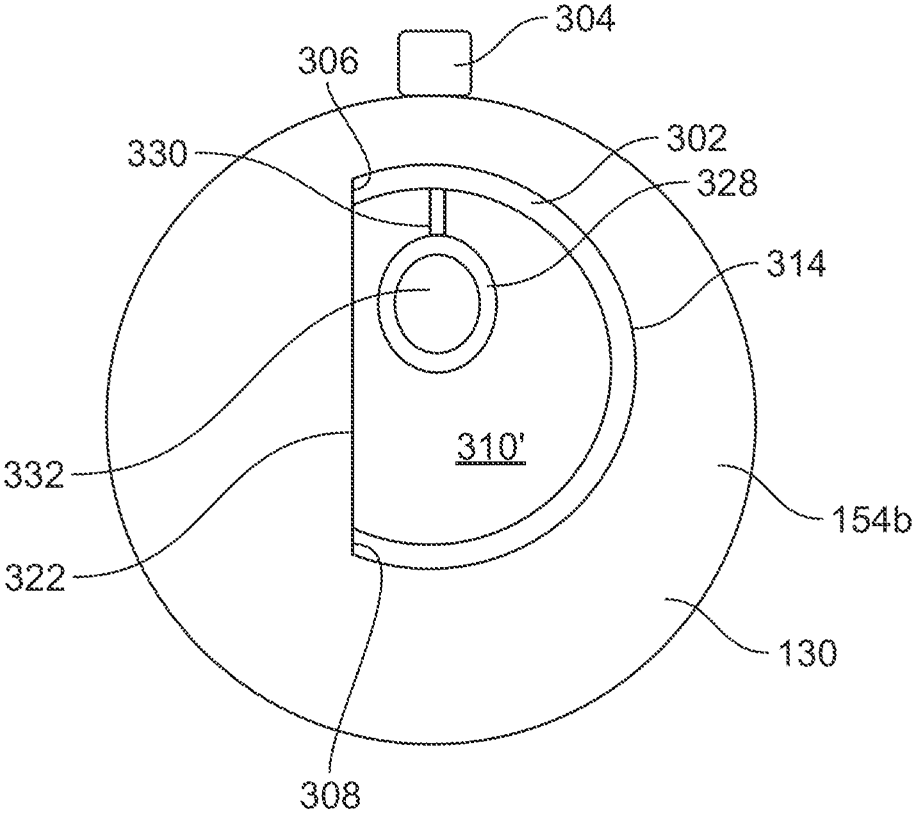
FIGS. 25A and 25B illustrate bottom views of an end cap for a fuse assembly having a displaceable pin assembly in an extended position and a retracted position, respectively, according to an embodiment.
Figure 25B:
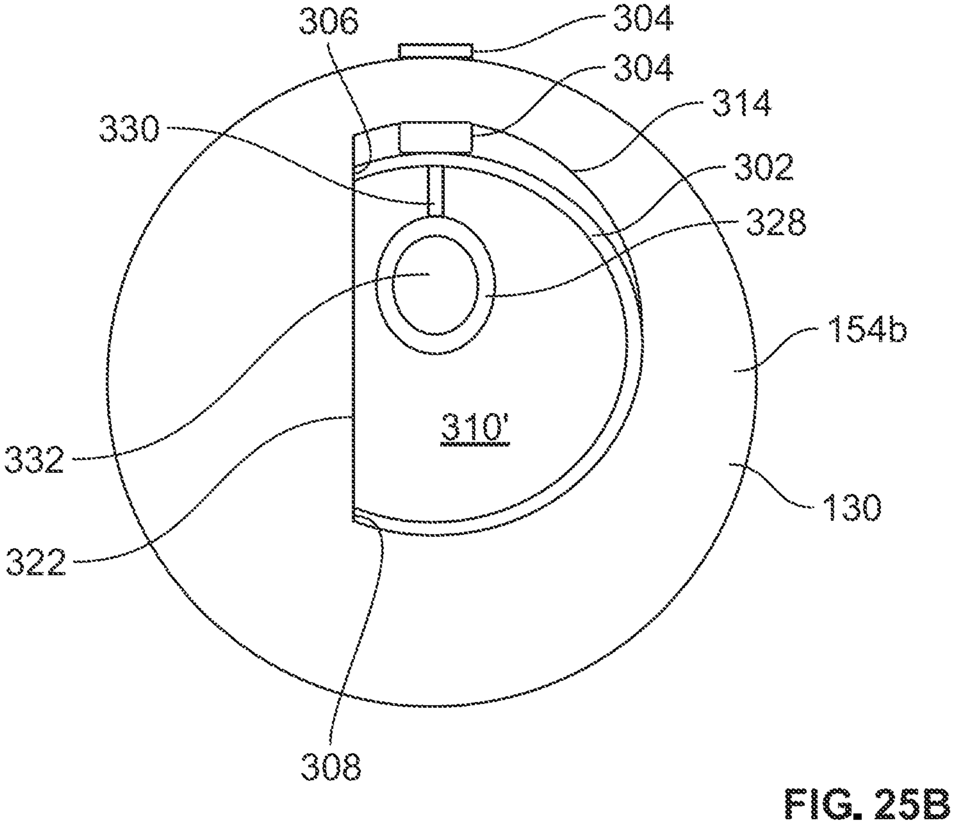

FIGS. 24A and 25A illustrate the pin assembly 300*a*, 300*b* positioned within the cavity 310, 310' of the end cap 130, and in which the plunger 304 is at a first, extended position. As show, the spring body 302 is in a generally at an extended position against the cavity wall 314, which may, for example, correspond to the spring body being minimally, if at all, compressed. Moreover, the portion of the spring body 302 in the vicinity of the cap bore 324 is generally adjacent to, if not abutting, the cavity wall 314.

Figure 24B:
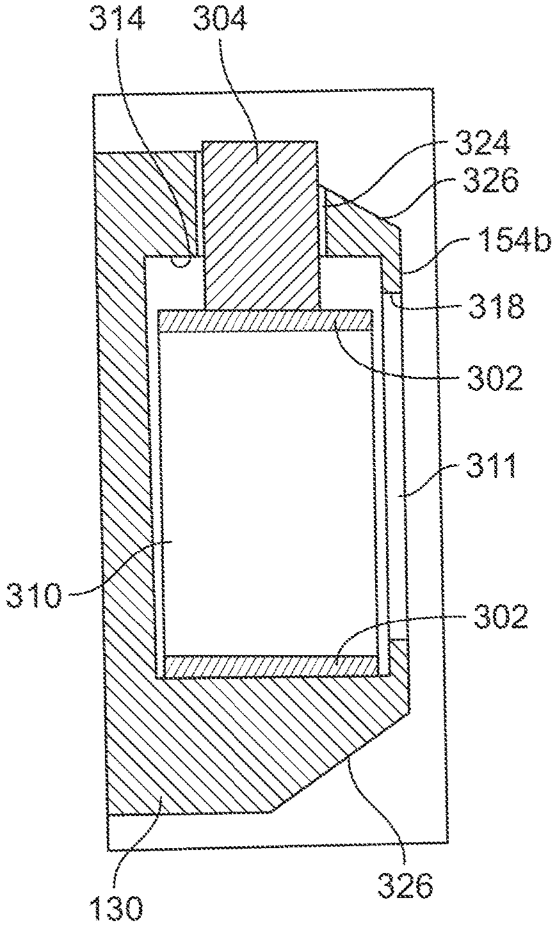

During installation of the fuse assembly 102 to the fuse cutout assembly 100, such as, for example, when or while the end cap 130 is being inserted into the interior region 128 of the lower adapter 122, as discussed above, the plunger 304 may be inwardly displaced to a second, retracted positioned, as shown, for example, in FIGS. 24A and 24B. Such displacement can involve inwardly displacing the first end 160 of the plunger 158 such that the first end 160 slightly outwardly protrudes from, if not flush or recessed within, the cap bore 324. The force is applied to inwardly displace the plunger 304 along the cap bore 324 can be provided in a variety of different manners. For example, with respect to the embodiment shown in FIGS. 24A and 25B, the end cap 130 can include a chamfer 326 that extends from the second end 154*b* of the end cap 130 to at least the cap bore 324. Such a chamfer 326 may increase the portion of the plunger 304 that is outside of the cap bore 324, thereby increasing the area of the plunger 304 that may be contacted or engaged by an installer. For example, such a chamfer 326 can increase the surface area of the plunger 304 that can be directly contacted by a digit or tool of an installer as the installer applied a force to retract the plunger 304 and thereby compress the spring body 302.

Alternatively, as shown in FIGS. 25A and 25B, the installer may be able to engage an engagement body 328, such as, for example button, tab, and/or ring, that can be coupled to the spring body 302 to a degree that can facilitate compression of the spring body 302 in a manner that causes the plunger 304 to be displaced to the second, retracted position. For example, FIGS. 25A and 25B depict an engagement body 328 in the form of a ring that is coupled, such as, for example, by a link 330, to a portion of the spring body 302 that is generally adjacent to the plunger 304. According to such an embodiment, the ring can have an aperture 332 that can receive placement of a digit or tool of the installer so as to assist the installer in securely engaging the ring as the installer provides a force in a direction generally away from the cap bore 324, thereby compressing the spring body 302 and inwardly displacing the plunger 304 to the retracted position.

As shown in FIGS. 24B and 25B, when the plunger 304 is at the retracted position, the portion of the spring body 302 that is adjacent to the plunger 304 can be offset from the adjacent portions of the cavity wall 314. Thus, when at such a position, the spring body 302 can be in a compressed state at which the degree of compression of the spring body 302 is larger than the degree of compression, if any, of the spring body 302 when the plunger 304 is at the first, extended position. According to certain embodiments, when at the second, retracted position, at least a portion of the plunger 304 remains within the cap bore 324.

When the force used to compress the spring body 302, and thus the force used to retract the plunger 304 to the second, retracted position, is subsequently released, such as, for example, upon release of the engagement body 328, the spring force provided by the spring body 302 can bias the plunger 304 back to the first, extended position. Thus, as the spring body 302 is released from such compressive forces, the spring body 302 provides a biasing force that linearly displaces at least a portion of the plunger 304 through the cap bore 324 and to back to the first, extended position, as shown in FIGS. 24A and 25B.

Figure 26:
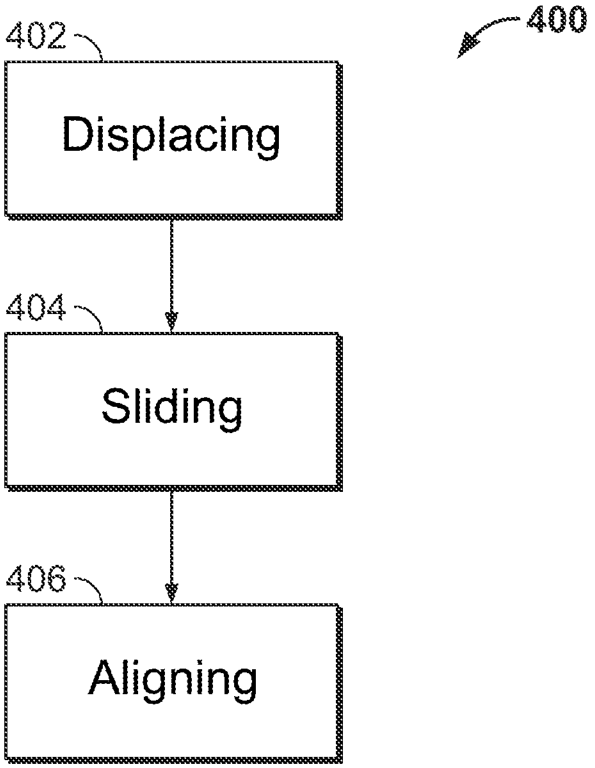
FIG. 26 illustrates an exemplary embodiment of a method.
Figure 27:
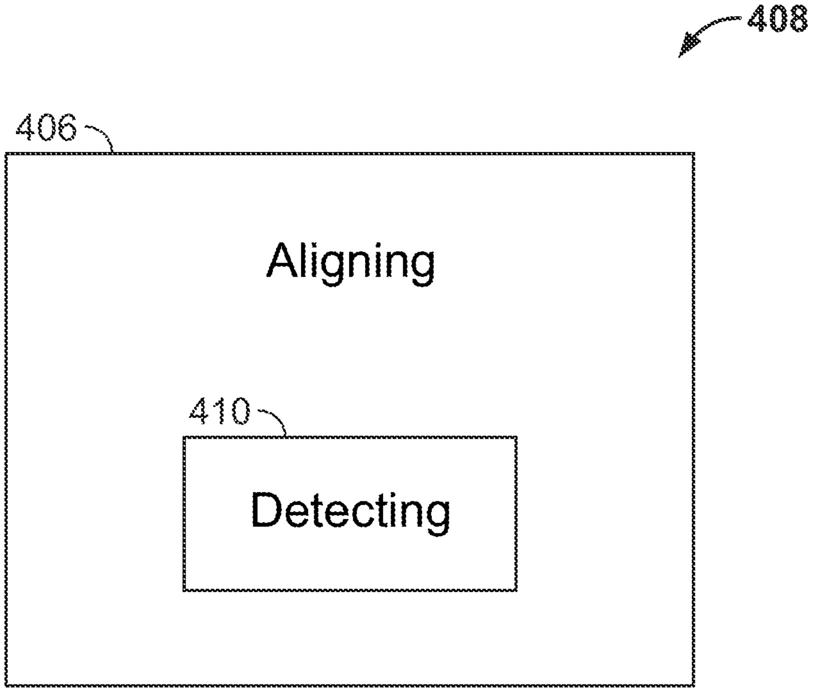
FIG. 27 illustrates an exemplary embodiment of a method.
Figure 28:
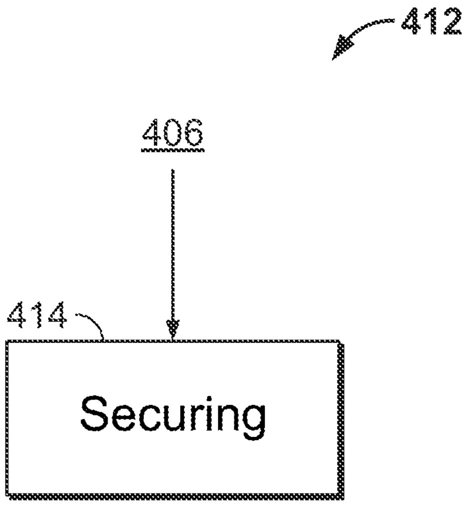
FIG. 28 illustrates an exemplary embodiment of a method.

FIGS. 26-28 illustrate various exemplary embodiments of methods for installing an adapter about a first end cap of a fuse assembly, wherein the first end cap and a second end cap of the fuse assembly each being an electrical contact that is electrically coupled to a fuse element that is housed within the fuse assembly. FIG. 26 illustrates a non-limiting exemplary flowchart according to some embodiments. The method 400 comprises inwardly displacing 402 a first end of a plunger from an extended position to a recessed position. In the extended position, the first end is positioned outside an outer surface of the first end cap. In the recessed position, the first end is in, or aligned with the outer surface of, the first end cap. The method 400 further comprises sliding 404 the adapter, while the plunger is at the recessed position, around at least a portion of the outer surface. In some embodiments, the sliding 404 step includes the adapter to comprise the first end cap entering an interior area of the adapter from a first end of the adapter, and wherein the notch is positioned around a second end, and not the first end, of the adapter. The method 400 further comprises aligning 406 a notch in the adapter with the plunger, with the adapter positioned around at least a portion of the outer surface.

FIG. 27 illustrates a non-limiting exemplary flowchart according to some embodiments. The method 408 comprises, all of the features shown in method 400 in FIG. 26, and further comprises, in the aligning 406 step, detecting 410 insertion of at least a portion of the plunger into the notch. In some embodiments, the detecting 410 can follow the aligning 406. In some embodiments, the detecting 410 and the aligning 406 can be cotemporaneous. In some embodiments, the aligning 406 can follow the detecting 410.

FIG. 28 illustrates a non-limiting exemplary flowchart according to some embodiments. The method 412 includes all of the method 400 shown in FIG. 26, and further comprises, after aligning 406 of the adapter, securing 414 the adapter to the first end cap and coupling, after securing, the adapter to a cutout assembly.

As used herein, the term “based on” is not exclusive and allows for being based on additional factors not described, unless the context clearly dictates otherwise. In addition, throughout the specification, the meaning of “a,” “an,” and “the” include plural references. The meaning of “in” includes “in” and “on.”

As used herein, the term “between” does not necessarily require being disposed directly next to other elements. Generally, this term means a configuration where something is sandwiched by two or more other things. At the same time, the term “between” can describe something that is directly next to two opposing things. Accordingly, in any one or more of the embodiments disclosed herein, a particular structural component being disposed between two other structural elements can be:

- disposed directly between both of the two other structural elements such that the particular structural component is in direct contact with both of the two other structural elements;
- disposed directly next to only one of the two other structural elements such that the particular structural component is in direct contact with only one of the two other structural elements;
- disposed indirectly next to only one of the two other structural elements such that the particular structural component is not in direct contact with only one of the two other structural elements, and there is another element which juxtaposes the particular structural component and the one of the two other structural elements;
- disposed indirectly between both of the two other structural elements such that the particular structural component is not in direct contact with both of the two other structural elements, and other features can be disposed therebetween; or any combination(s) thereof.

Aspects

Various Aspects are described below. It is to be understood that any one or more of the features recited in the following Aspect(s) can be combined with any one or more other Aspect(s).

Aspect 1. A fuse assembly comprising:

- a casing positioned between a first end cap and a second end cap of the fuse assembly, the first end cap and the second end cap each being an electrical contact that is electrically coupled to a fuse element, the fuse element being housed at least within an interior region of the casing; and a displaceable pin assembly, a least a portion of the displaceable pin assembly being secured within a cap bore of the first end cap,
- wherein the displaceable pin assembly comprises a plunger that is selectively displaceable along an axis that is non-parallel to a central longitudinal axis of the first end cap, the plunger being selectively displaceable between an extended position at which at least a first end of the plunger is outwardly positioned away from an outer surface of the first end cap, and a recessed position at which the first end of the plunger is recessed within the first end cap or is generally aligned with the outer surface of the first end cap.

Aspect 2. The fuse assembly of Aspect 1, wherein the cap is being non-parallel to the central longitudinal axis of the first end cap, the central longitudinal axis of the first end cap generally coinciding with a central longitudinal axis of the fuse assembly.

Aspect 3. The fuse assembly of any preceding Aspect(s), wherein the cap bore inwardly extends from the outer surface of the first end cap in a direction that is generally perpendicular to the central longitudinal axis of the first end cap.

Aspect 4. The fuse assembly of Aspect 3, wherein the cap bore extends through only one side of the first end cap.

Aspect 5. The fuse assembly of any preceding Aspect(s), wherein the cap bore is configured to retain at least a portion of the plunger within the cap bore at least when the plunger is at the extended position.

Aspect 6. The fuse assembly of any preceding Aspect(s), wherein the displaceable pin assembly further includes a support body securely positioned within the cap bore.

Aspect 7. The fuse assembly of Aspect 6, wherein at least a portion of the plunger is housed within an inner area of the support body.

Aspect 8. The fuse assembly of Aspect 7, wherein the support body is configured to retain at least a portion of the plunger within the inner area at least when the plunger is at the extended position.

Aspect 9. The fuse assembly of any one of Aspect(s) 6 to 8, wherein the support body threadlingly engages at least a portion of the cap bore.

Aspect 10. The fuse assembly of Aspect 6, wherein the cap bore extends between a first side and a second side of the first end cap, the plunger being positioned to pass through the first side of the first end cap as the plunger is displaced to the extended position.

Aspect 11. The fuse assembly of any preceding Aspect(s), wherein the displaceable pin assembly further includes a biasing element that biases the plunger toward one of the extended position and the recessed position.

Aspect 12. The fuse assembly of Aspect 11, wherein the plunger is biased to the extended position.

Aspect 13. A fuse cutout assembly comprising:

a cutout body having a first contact, a second contact, and an insulator; an upper adapter configured for releasable coupling to the cutout body;

a lower adapter configured to be pivotally coupled to the cutout body, the lower adapter having a notch in a wall of the lower adapter; and a fuse assembly comprising:

a first end cap configured to be securely positioned within an interior area of the lower adapter;

a second end cap configured to be securely attached to the upper adapter;

a casing positioned between a first end cap and a second end cap, the first end cap and the second end cap each being an electrical contact that is electrically coupled to a fuse element, the fuse element being housed at least within an interior region of the casing; and a displaceable pin assembly, at least a portion of the displaceable pin assembly being secured within the first end cap, the displaceable pin assembly having a plunger that is selectively displaceable along an axis that is non-parallel to a central longitudinal axis of the fuse assembly, the plunger being selectively displaceable between an extended position at which at least a first end of the plunger is outwardly positioned away from an outer surface of the first end cap, and a recessed position at which the first end of the plunger is recessed within the first end cap or is generally aligned with the outer surface of the first end cap, the plunger being configured to be received in the notch of the lower adapter when the first end cap is positioned in the interior area of the lower adapter and the plunger is aligned with the notch and at the extended position, wherein the notch and the plunger are positioned to, when the plunger is received in the notch, orient the fuse assembly at a predetermined rotational and linear alignment relative to at least the lower adapter.

Aspect 14. The fuse cutout assembly of Aspect 13, wherein the displaceable pin assembly further includes a biasing element that biases the plunger toward one of the extended position and the recessed position.

Aspect 15. The fuse cutout assembly of any of Aspect(s) 13 or 14, wherein the displaceable pin assembly further includes a support body securely positioned within the first end cap.

Aspect 16. The fuse cutout assembly of any of Aspect(s) 13-15, wherein at least a portion of the displaceable pin assembly is positioned in a cap bore in the first end cap, the cap bore inwardly extending from, and through, at least a first side of the first end cap, and wherein the plunger is positioned to pass through the first side of the first end cap as the plunger is displaced to the extended position Aspect 17. A method of installing an adapter about first end cap of a fuse assembly, the first end cap and a second end cap of the fuse assembly each being an electrical contact that is electrically coupled to a fuse element that is housed within the fuse assembly, the method comprising:

inwardly displacing a first end of a plunger from an extended position at which the first end is positioned outside an outer surface of the first end cap to a recessed position at which the first end is in, or aligned with the outer surface of, the first end cap;

sliding, while the plunger is at the recessed position, the adapter around at least a portion of the outer surface; and aligning, with the adapter positioned around at least a portion of the outer surface, a notch in the adapter with the plunger.

Aspect 18. The method of Aspect 17, wherein the step of aligning includes detecting insertion of at least a portion of the plunger into the notch.

Aspect 19. The method of Aspect 18, wherein the step of sliding the adapter comprises the first end cap entering an interior area of the adapter from a first end of the adapter, and wherein the notch is positioned around a second end, and not the first end, of the adapter.

Aspect 20. The method of Aspect 19, further comprising securing, after aligning of the adapter, the adapter to the first end cap and coupling, after securing, the adapter to a cutout assembly.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

What is claimed is:

1. A fuse cutout assembly comprising:

a cutout body, wherein the cutout body includes a first contact, a second contact, and an insulator;

an upper adapter configured for releasable coupling to the cutout body;

a lower adapter configured to be pivotally coupled to the cutout body, wherein the lower adapter includes a notch in a wall of the lower adapter;

and a fuse assembly, wherein the fuse assembly comprises:

a first end cap configured to be securely positioned within an interior area of the lower adapter;

a second end cap configured to be securely attached to the upper adapter;

a casing positioned between the first end cap and the second end cap, the first end cap and the second end cap each being an electrical contact that is electrically coupled to a fuse element, the fuse element being housed at least within an interior region of the casing; and a displaceable pin assembly, wherein at least a portion of the displaceable pin assembly being secured within the first end cap, the displaceable pin assembly including:

a plunger that is selectively displaceable along an axis that is non-parallel to a central longitudinal axis of the fuse assembly, the plunger being selectively displaceable between an extended position at which at least a first end of the plunger is outwardly positioned away from an outer surface of the first end cap, and a recessed position at which the first end of the plunger is recessed within the first end cap or is generally aligned with the outer surface of the first end cap, the plunger being configured to be received in the notch of the lower adapter when the first end cap is positioned in the interior area of the lower adapter and the plunger is aligned with the notch and at the extended position, wherein the notch and the plunger are positioned to, when the plunger is received in the notch, orient the fuse assembly at a predetermined rotational and linear alignment relative to at least the lower adapter.

2. The fuse cutout assembly of claim 1, wherein the displaceable pin assembly further includes a biasing element that biases the plunger toward one of the extended position and the recessed position.

3. The fuse cutout assembly of claim 1, wherein the displaceable pin assembly further includes a support body securely positioned within the first end cap.

4. The fuse cutout assembly of claim 1, wherein at least a portion of the displaceable pin assembly is positioned in a cap bore in the first end cap, the cap bore inwardly extending from, and through, at least a first side of the first end cap, and wherein the plunger is positioned to pass through the first side of the first end cap as the plunger is displaced to the extended position.

* * * * *